(12) United States Patent
Bookbinder et al.

(10) Patent No.: US 10,429,589 B2
(45) Date of Patent: Oct. 1, 2019

(54) OPTICAL FIBER FOR SILICON PHOTONICS

(71) Applicant: Corning Incorporated, Corning, NY (US)

(72) Inventors: Dana Craig Bookbinder, Corning, NY (US); Ming-Jun Li, Horseheads, NY (US); Dale Robert Powers, Painted Post, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/888,666

(22) Filed: Feb. 5, 2018

(65) Prior Publication Data

US 2018/0224607 A1  Aug. 9, 2018

Related U.S. Application Data

(60) Provisional application No. 62/455,728, filed on Feb. 7, 2017.

(51) Int. Cl.
*G02B 6/30* (2006.01)
*G02B 6/028* (2006.01)
(Continued)

(52) U.S. Cl.
CPC .............. *G02B 6/305* (2013.01); *C03B 32/00* (2013.01); *C03B 37/01* (2013.01); *C03B 37/16* (2013.01); *C03C 13/046* (2013.01); *G02B 6/02028* (2013.01); *G02B 6/0281* (2013.01); *G02B 6/2552* (2013.01); *G02B 6/262* (2013.01);
(Continued)

(58) Field of Classification Search
CPC .. G02B 6/305; G02B 6/02028; G02B 6/4206; G02B 6/3833; G02B 6/0281; C03C 13/046; C03C 2213/00; C03B 32/00; C03B 37/01; C03B 37/16
See application file for complete search history.

(56) References Cited

U.S. PATENT DOCUMENTS

| 6,275,627 B1 | 8/2001 | Wu |
| 7,333,702 B2 | 2/2008 | Fujita et al. |

(Continued)

FOREIGN PATENT DOCUMENTS

| EP | 0582894 A1 | 2/1994 |
| EP | 0895103 A1 | 2/1999 |

(Continued)

OTHER PUBLICATIONS

International Search Report and Written Opinion PCT/US2018/017012 dated May 22, 2018.

(Continued)

*Primary Examiner* — Ellen E Kim
(74) *Attorney, Agent, or Firm* — Smit Kapadia; Svetlana Z. Short

(57) ABSTRACT

An optical fiber for efficient coupling of optical signals to photonic devices. The optical fiber includes a Cl doped tapered core region with a changing outer diameter and changing maximum core refractive index to provide improved coupling at wavelength of interest to photonic devices. The photonic devices may be, for example, silicon photonic devices with an operating wavelength at or near 1310 nm, or at or near 1550 nm.

36 Claims, 39 Drawing Sheets

(51) Int. Cl.
*G02B 6/38* (2006.01)
*G02B 6/42* (2006.01)
*C03B 37/16* (2006.01)
*C03B 37/01* (2006.01)
*C03B 32/00* (2006.01)
*C03C 13/04* (2006.01)
*G02B 6/02* (2006.01)
*G02B 6/255* (2006.01)
*G02B 6/26* (2006.01)

(52) U.S. Cl.
CPC ........... *G02B 6/3833* (2013.01); *G02B 6/421* (2013.01); *G02B 6/4206* (2013.01); *C03C 2213/00* (2013.01)

(56) References Cited

U.S. PATENT DOCUMENTS

| | | | |
|---|---|---|---|
| 7,606,452 B2 | 10/2009 | Bilodeau et al. | |
| 2002/0057877 A1* | 5/2002 | Sasaoka | G02B 6/2551 385/95 |
| 2002/0114594 A1* | 8/2002 | Kato | G02B 6/2551 385/96 |
| 2003/0180016 A1* | 9/2003 | Yamada | G02B 6/2551 385/96 |
| 2003/0194185 A1* | 10/2003 | Tamura | G02B 6/14 385/39 |
| 2004/0096174 A1* | 5/2004 | Tankala | G02B 6/02361 385/125 |
| 2005/0036740 A1* | 2/2005 | Itabashi | G02B 6/3877 385/50 |
| 2018/0180818 A1* | 6/2018 | Jiang | G02B 6/1228 |

FOREIGN PATENT DOCUMENTS

| | | | | |
|---|---|---|---|---|
| EP | 1296164 A2 | 3/2003 | | |
| WO | 2007122630 A2 | 11/2007 | | |
| WO | WO 2015168419 A1 * | 11/2015 | ............. | G02B 6/305 |

OTHER PUBLICATIONS

Hanafusa et al. "thermally diffused expanded core fibres for low-loss and inexpensive photonic components" Electronics Letters, 27(21) 1991, pp. 1968-1969.

Fu et al; "Efficient Adiabatic Silicon-on-Insulator Waveguide Taper"; Photon Res. vol. 2, No. 3, Jun. 2014; pp. A41-A44.

\* cited by examiner

OPTICAL FIBER FOR SILICON PHOTONICS

This application claims the benefit of priority under 35 U.S.C. § 119 of U.S. Provisional Application Ser. No. 62/455,728, filed on Feb. 7, 2017, the content of which is relied upon and incorporated herein by reference in its entirety.

BACKGROUND

The disclosure relates generally to the coupling of optical fibers to light sources and other optical waveguides having different optical properties and more particularly to an optical fiber having an expanded Mode Field Diameter ("MFD"), and a method of expanding the mode field diameter of optical fibers for subsequent coupling to silicon photonic devices.

Silicon photonic (SiP) transceivers are attractive for data center applications because they can potentially offer high data rates and longer distance compared to 850 nm VCSEL systems. A key issue for cost sensitive data center application is to efficiently and inexpensively couple a SiP laser to an optical fiber. Although it is easier to couple a laser into a large core diameter and high numerical aperture multimode fiber, the bandwidth is lower than single-mode or small core fewer mode fibers. Therefore there is a need to develop coupling devices that can couple a SiP laser or similar light sources to single mode fiber with low costs.

Furthermore, as the fiber optic industry has matured, specialty fibers such as dispersion compensating fibers, or fibers with large mode field diameters often need to be coupled to single mode fibers without exhibiting excessive connection losses, or "splice losses" as they are known to those skilled in the photonic light-wave system art. However these specialty fibers have mode field diameters that differ in size and other aspects from the mode field diameters of the single mode fibers or devices to large mode fibers will be coupled or connected. The connection of fibers having such mismatched mode field diameters to one another generally results in excessive splice loss.

No admission is made that any reference cited herein constitutes prior art. Applicant expressly reserves the right to challenge the accuracy and pertinency of any cited documents.

SUMMARY

One embodiment of the disclosure relates to an optical fiber comprising: a length L, a first end face and a second end face, and a MFD at the first end face of the fiber that is different from MFD at another region of the fiber, the fiber further comprising:
(I) a Cl doped silica based core comprising:
  (a) a first Cl doped core region having a maximum refractive index $\Delta_0$ such that $0.05\% \leq \Delta_0 \leq 0.6\%$ (relative to undoped silica), and an outer core diameter $D_0$, wherein 5 microns$\leq D_0 \leq$12 microns, the first Cl doped core region having maximum Cl concentration [Cl], where 0.5 wt. %$\leq$[Cl]$\leq$5 wt. %; and
  (b) a Cl doped tapered core region situated adjacent to the first Cl doped core region and to the first fiber end face, the Cl doped tapered core region, and a maximum core refractive index, $\Delta c$ that decreases along the length of the tapered core region, the tapered region having an outer diameter that changes along the length and a maximum diameter $D_{max}$, such that:
    (i) $D_{max} \geq D_0 + 3$ microns;
    (ii) 8 microns$\leq D_{max} \leq$70 microns; and
(II) a silica based cladding surrounding the core.

According to some embodiments, fiber coupler comprises: (i) a housing; (ii) a ferrule situated inside said housing, and an optical fiber described above situated within the ferrule, the ferrule being structured to receive and support at least a portion of another optical fiber herein. According to some embodiments the optical fiber with Cl doped silica based core and another optical fiber are situated adjacent to one another within the ferrule, and are optically coupled to one another.

According to at least some of the embodiments disclosed herein the cladding comprises a constant outer diameter throughout the length of the fiber. According to at least some of the embodiments disclosed herein the first Cl doped core region has a length $L_1$, and $L_1 >$12 cm. According to at least some of the embodiments disclosed herein the Cl doped tapered core region comprises a length $L_2$ where 0.05 mm$\leq L_2 \leq$10 mm. For example, according to some embodiments, optical fiber comprises the first Cl doped core region a length $L_1$, tapered core region comprises a length $L_2$, wherein and $L_1 >$12 cm and 0.05 mm$\leq L_2 \leq$10 mm.

According to some embodiments an optical fiber comprises:
a length L, a first end face and a second end face, and a MFD at the first end face of the fiber that is different at from the MFD in another region of the fiber (e.g., MFD at the first end face of the fiber that is different from the MFD at the second end face of the fiber), said fiber further comprising:
(I) a Cl doped silica based core comprising:
  (a) a first Cl doped core region having a constant maximum refractive index $\Delta_0$, along its length $L_1$ such that $0.05\% \leq \Delta_0 \leq 0.6\%$ (relative to undoped silica), and constant outer core diameter $D_0$ along its length $L_1$, wherein 5 microns$\leq D_0 \leq$12 microns and $L_1 >$12 cm, said first Cl doped core region having maximum Cl concentration [Cl], where 0.5 wt. %$\leq$[Cl]$\leq$5 wt. %; and
  (b) a Cl doped tapered core region situated adjacent to the first Cl doped core region and to the first fiber end face, the Cl doped tapered core region having a length $L_2$ where 0.05 mm$\leq L_2 \leq$10 mm, and a maximum core refractive index, $\Delta c$ that decreases along the length $L_2$ of the tapered core region, the tapered region having an outer diameter that changes along the length $L_2$ and a maximum diameter $D_{max}$, such that:
    (i) $D_{max} \geq D_0 + 3$ microns;
    (ii) 8 microns$\leq D_{max} \leq$70 microns; and
(II) a silica based cladding surrounding the core, said cladding having a constant outer diameter throughout the length of the fiber.

According to some embodiments the disclosure relates to an optical fiber having a length, a first end face and a second end face, and a MFD that is different at the first end face of the fiber from the MFD at the second end face of the fiber, In some embodiments the length $L_2$ is 0.05 mm to 50 mm, in some embodiments 0.5 mm to 20 mm, and in some embodiments 1 mm to 2 cm. In some embodiments the length $L_2$ is 0.05 mm$\leq L_2 \leq$1 mm. In some embodiments the length $L_2$ is 0.2 mm$\leq L_2 \leq$5 mm. In some embodiments 10 microns/mm$\leq (D_{max} - D_0)/L_2 \leq$100 microns/mm. In some embodiments is 14 microns/mm$\leq (D_{max} - D_0)/L_2 \leq$86 microns/mm. In some embodiments is 14 microns/mm$\leq (D_{max} - D_0)/L_2 \leq$35 microns/mm.

In some embodiments the tapered core region has a taper profile, the tapered profile having: a linear taper, a parabolic taper, an exponential taper, or a Gaussian taper. In some embodiments tapered core region has an adiabatic taper and satisfies the following condition:

$$\frac{dD}{dz} \le \frac{D}{\lambda}(n_{\mathit{eff}} - n_{cl})$$

where D is the core diameter at a position z within the tapered core region, λ is the operating wavelength, $n_{\mathit{eff}}$ is the effective index of the fundamental mode, and $n_{cl}$ is the refractive index of the cladding. In some embodiments λ=1310 nm. In some embodiments λ=1550 nm. In some embodiments λ=980 nm.

In some embodiments the tapered core region has a substantially adiabatic taper and satisfies the following condition $$\frac{dD}{dz} \le 2\frac{D}{\lambda}(n_{\mathit{eff}} - n_{cl})$$

In some embodiments the maximum concentration of Cl in the core is between 1.1 wt. % and 5 wt. %. In some embodiments the core comprises at least one region with maximum Cl concentration between 1.4 wt. % and 5 wt. %.

In some embodiments 0.0%≤|Δc (at $D_{max}$)|≤0.3%, relative to undoped silica, for example wherein 0.0%≤|Δc (at $D_{max}$)|≤0.2%.

In some embodiments the length $L_2$ is less than 3 cm. In some embodiments $L_2$ is 0.05 mm to 30 mm, in some embodiments 0.5 mm to 20 mm, and in some embodiments 1 mm to 2 cm.

According to at least some of embodiments the cladding is an F doped silica based cladding. According to some embodiments the maximum F concentration in the fiber cladding is 1 wt %. According to some embodiments the maximum F concentration in the fiber cladding is, for example, 0.05 wt % to 0.75% wt %.

According to some embodiments the Cl doped tapered core region has an adiabatic taper.

According to some embodiments the tapered core region has a taper induced loss of ≤0.2 dB at 1550 nm. According to some embodiments the tapered core region has a taper induced loss of ≤0.2 dB at 1310 nm. According to some embodiments the tapered core region has a taper induced loss of ≤0.1 dB at 1310 nm.

According to some embodiments the refractive index delta Δc at a location corresponding to the maximum diameter maximum $D_{max}$ is about −0.2% to about 0.8% relative to pure silica (i.e., −0.2%≤Δc (at $D_{max}$)≤0.8%). According to some embodiments the refractive index delta Δc at a location corresponding to the maximum diameter maximum $D_{max}$ is ≤0.4% (i.e., Δc (at $D_{max}$)≤0.4%, relative to undoped silica. According to some embodiments, |Δc (at $D_{max}$)|≤0.2% relative to undoped (pure) silica. According to some embodiments, |Δc (at $D_{max}$)|≤0.15% relative to undoped (pure) silica. According to other embodiments, |Δc (at $D_{max}$)|≤0.1%, relative to undoped (pure) silica. According to some embodiments, 0%≤|Δc (at $D_{max}$)|≤0.3%, relative to undoped silica. In some embodiments 0.0%≤|Δc (at $D_{max}$)|≤0.2%, %, relative to undoped silica. According to some embodiments 0.15%≤[$\Delta_0$−Δc (at $D_{max}$)]≤0.37%.

According to some embodiments the cladding is an F doped cladding and |Δc (at $D_{Max}$)|≤0.2% relative to pure silica. According to some embodiments the cladding is an F doped cladding, and |Δc (at $D_{max}$)|≤0.15% relative to pure silica.

Advantageously, the optical fibers disclosed herein can be utilized to provide low coupling for silicon photonics and VCSEL light sources.

According to some embodiments, a method of forming a tapered core in a glass optical fiber comprising a chlorine doped core surrounded by a cladding comprises the steps of:
(a) applying heat for a cumulative duration of less than 60 seconds (e.g., less than 50 seconds, less than 45 seconds, and in some embodiments less than 30 seconds) to a region of the optical fiber, thereby diffusing chlorine from the core of the optical fiber into the cladding of the optical fiber, and expanding the mode field diameter MFD by at least 3 microns; and
(b) cleaving the optical fiber in the region of the fiber where the mode field MFD was expanded by at least 3 microns.

According to some embodiments, the maximum amount of chlorine in the fiber core before the step of applying heat is between 0.5 wt. % and 5 wt. %. According to some embodiments, the maximum amount of chlorine in the fiber core before the step of applying heat is between 1.4 wt. % and 5 wt. %. According to some embodiments the Cl doped core region, prior before the step of applying heat, has a maximum refractive index $\Delta_0$ such that 0.05%≤$\Delta_0$≤0.6% (relative to undoped silica). According to some embodiments, the step of applying heat is performed at a temperature Td, and 1500° C.≤Td≤2100° C., for example 1600° C.≤Td≤2000° C.

According to some embodiments, a method of forming a low loss taper in a glass optical fiber comprising greater than 0.5 wt % chlorine in a core, the core having an initial mode field diameter MFD (at 1550 nm) and is being surrounded by a cladding, said method comprising the steps of:
expanding the initial mode field diameter MFD at 15550 nm by at least 3 microns by applying heat to the optical fiber for less than 60 seconds in cumulative duration, thereby diffusing chlorine from the core of the optical fiber into the cladding of the optical fiber;
cleaving the optical fiber at a location where the MFD was expanded by at least 3 microns.

According to some embodiments, a method of forming a core taper in a glass optical fiber comprising a chlorine doped core surrounded by a cladding, comprises the steps of:
placing the optical fiber in a holding fixture situated proximate a heat source; expanding the optical fiber's MFD by at least 3 microns by applying heat from the heat source to the optical fiber for less than 60 seconds in cumulative duration, thereby diffusing chlorine from the core of the optical fiber into the cladding of the optical fiber; and
cleaving the optical fiber at a location where the MFD was expanded by at least 3 microns. According to some embodiments chlorine doped core has a maximum Cl concentration [Cl], where 0.5 wt. %≤[Cl]≤5 wt. %.

According to one embodiment a method of forming an adiabatic taper or a substantially adiabatic taper in an optical fiber core comprising maximum Cl concentration [Cl], where 0.5 wt. %≤[Cl]≤5 wt. %; the method comprises the steps of:
(a) aligning and abutting a cleaved end of said optical fiber to a cleaved end of a second optical fiber,
(b) providing a heat source adjacent to the optical fibers and forming a heat region provided by a heat source (first heating step), to form a splice seam between the optical fibers;

(c) applying heat (second heating step) in the heat region to splice the optical fibers and expanding the mode field diameters MFDs of the optical fibers while diffusing at least one dopant from the cores of the first and second optical fibers into the respective claddings of the first and second optical fibers; wherein the step of applying heat is less than 1 minute in cumulative duration, optionally monitoring decrease in splice loss;

terminating the application of heat when the splice loss is at or sufficiently close to a target loss.

According to one embodiment a method of forming an adiabatic taper or a substantially adiabatic taper in an optical fiber core comprising maximum Cl concentration [Cl], where 0.5 wt. %≤[Cl]≤5 wt. % and a first MFD; the method comprises the steps of:

(a) aligning and abutting a cleaved end of said optical fiber having the first MFD to a cleaved end of a second optical fiber, the second optical fiber having a second mode field diameter that is larger than the first MFD of the first optical fiber, (b) providing a heat source adjacent to first and second optical fibers and forming a heat region provided by a heat source (first heating step), to form a splice seam between the optical fibers;

(c) optionally offsetting the splice seam a predetermined distance from the center of the heat region of the heat source;

(d) applying heat (second heating step) in the heat region to splice the optical fibers and expanding the mode field diameters MFDs of the optical fibers while diffusing at least one dopant from the cores of the first and second optical fibers into the respective claddings of the first and second optical fibers; wherein the step of applying heat is less than 1 minute in cumulative duration.

According to one embodiment a method of forming an adiabatic taper or a substantially adiabatic taper in an optical fiber core comprising maximum Cl concentration [Cl], where 0.5 wt. %≤[Cl]≤5 wt. % and a first MFD; the method comprises the steps of:

(a) aligning and abutting a cleaved end of the said optical fiber having the first MFD to a cleaved end of a second optical fiber, the second optical fiber having a second mode field diameter that is larger than the first MFD of the first optical fiber, (b) providing a heat source adjacent to first and second optical fibers (first heating step) and forming a heat region provided by a heat source, to form a splice seam between the optical fibers;

(c) optionally offsetting the splice seam a predetermined distance from the center of the heat region of the heat source;

(d) applying heat (second heating step) in the heat region to splice the optical fibers and expanding the mode field diameters MFDs of the optical fibers while diffusing at least one dopant from the cores of the first and second optical fibers into the respective claddings of the first and second optical fibers; wherein the step of applying heat is less than 1 minute in cumulative duration, optionally monitoring decrease in splice loss;

terminating the application of heat when the splice loss is at or sufficiently close to a target loss.

According to some embodiments the method further includes cleaving the chlorine doped optical fiber at a location where heat from the heat source was delivered to the first optical fiber.

According to some embodiments, the step of applying heat is not greater than 45 seconds cumulative (total) duration. According to some embodiments, the step of applying heat is not greater than 30 seconds in cumulative (total) duration. According to some embodiments, the step of applying heat is, for example 1 second to 30 seconds, in some embodiments 3 seconds to 30 seconds, and in some embodiments 5 to 30 seconds in cumulative (total) duration.

According to some embodiments the at least one dopant comprises chlorine (Cl).

According to one embodiment, a method of forming an adiabatic taper or a substantially adiabatic taper in an optical fiber, comprises the steps of:

cleaving one end of an optical fiber having a mode field diameter MFD, thereby forming a cleaved end applying heat to a segment of the optical fiber with a predetermined segment length from the cleaved end by moving the fiber segment through a heat source, wherein the heat is applied to the fiber segment for no a total time of less than 1 minute;

controlling fiber moving velocity to expand the mode field diameter MFD adiabatically from an inner end of the segment towards the cleaved end.

According to one embodiment, a method of forming an adiabatic taper or a substantially adiabatic taper in an optical fiber comprises the steps of:

removing a fiber coating from a fiber segment having a predetermined length, the segment being situated in the middle region of an optical fiber, the optical fiber having a mode field diameter MFD applying heat to the segment the fiber segment via a heat source for a total time of less than of 1 minute;

expanding the mode field diameter MFD adiabatically from both ends of the segment towards middle of the segment; and cleaving the fiber segment in the middle (or internal region) to form two adiabatic tapers.

According to some embodiments the step of applying heat is performed for 1 second to 45 seconds. According to some embodiments the step of applying heat is performed for a total of 1 second to 30 seconds at each location. According to some embodiments the step of applying heat is performed for 3 seconds to 30 seconds at each location or segment of the fiber. According to some embodiments the method the step of applying heat is performed for 5 seconds to 30 seconds at each location. According to some the heat is applied at each location for 1 second and 45 seconds at a temperature Td, wherein Td<2100° C., preferably less than 2000° C. According to some embodiments 1500° C.<Td≤2100° C. According to some embodiments 1600° C.<Td≤2100° C. According to some embodiments, 1600° C.<Td≤2000° C. According to some embodiments, 1700° C.<Td≤2000° C.

According to some embodiments a system comprises:

a silicon photonic device optically coupled to an optical fiber, the optical fiber comprising:

a Cl doped silica based tapered core region, the tapered core region having an outer diameter Dc that changes along the length $L_2$ of the tapered core region and a maximum outer diameter $D_{max}$ such that 8 microns≤$D_{max}$≤70 microns; the tapered core region further comprising a maximum core refractive index Δc that decreases along its length and a silica based cladding surrounding the core. According to some embodiments the cladding has a constant outer diameter throughout the length of the fiber.

According to some embodiments, the silicon photonic device includes a waveguide, the optical fiber optically being optically coupled to the waveguide.

According to some embodiments the system comprises a transition waveguide situated between the silicon photonic device and the optical fiber, the optical fiber being optically coupled to said transition waveguide, the transition waveguide being optically coupled to the silicon photonic device. According to some embodiments the silicon photonic device includes a silicon photonic SiP waveguide, the said transition waveguide optically coupling to the silicon photonic device through said silicon photonic SiP waveguide.

According to some embodiments a fiber coupler comprises: (i) a housing; (ii) a ferrule situated inside said housing, and an optical fiber situated within said ferrule, the fiber further comprising:

(I) a Cl doped silica based core comprising:

(a) a first Cl doped core region having a maximum refractive index $\Delta_0$ such that $0.05\% \leq \Delta_0 \leq 0.6\%$ (relative to undoped silica), and an outer core diameter $D_0$, wherein 5 microns $\leq D_0 \leq 12$ microns, the first Cl doped core region having maximum Cl concentration [Cl], where 0.5 wt. % $\leq$ [Cl] $\leq$ 5 wt. %; and (b) a Cl doped tapered core region situated adjacent to the first Cl doped core region and to the first fiber end face, the Cl doped tapered core region, and a maximum core refractive index, $\Delta c$ that decreases along the length of the tapered core region, the tapered region having an outer diameter that changes along the length and a maximum diameter $D_{max}$, such that (i) $D_{max} \geq D_0 + 3$ microns;

(ii) 8 microns $\leq D_{max} \leq 70$ microns; and (II) a silica based cladding surrounding the core said ferrule being structured to receive and support at least a portion of another optical fiber therein.

Additional features and advantages will be set forth in the detailed description which follows, and in part will be readily apparent to those skilled in the art from the description or recognized by practicing the embodiments as described in the written description and claims hereof, as well as the appended drawings. It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

The thermally diffused expanded core method described herein uses the phenomenon of dopant diffusion in a heated fiber to expand the mode field diameter. One approach to the fusion connection of two fibers with different mode field diameters is to continuously or adiabatically vary the core diameters of one or both fibers so that the mode field diameters match at their boundaries. During the process of dopant diffusion, the core diameter becomes larger locally, and the relative refractive index difference becomes smaller locally compared to the ordinary fiber part. The result is a tapered core and thus tapered mode field diameter within the fiber. The embodiments of the method for making thermally diffused expanded core described herein provide one or more of the following advantages: it is effective for many applications, are relatively inexpensive, and can be accomplished relatively quickly and inexpensively.

Figure 1A:
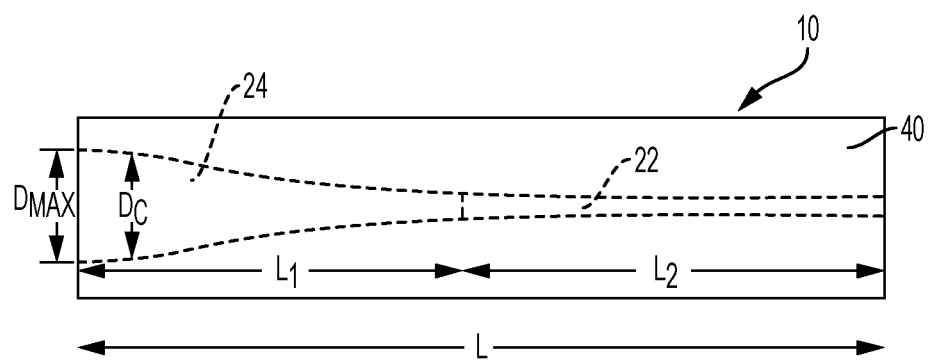
FIG. 1A is a schematic cross-sectional view of the optical fiber according to one embodiment.

FIG. 1A is an enlarged partial cross-sectional view of an expanded mode field diameter (uncoated) optical fiber 10 according to one exemplary embodiment of the present invention. This fiber has a length L and a mode field diameter on one end face (e.g., end face 12) of the fiber that is larger than the mode field diameter (MFD) at the other end face (end face 14) of the fiber. The optical fiber 10 is a "jumper" fiber for connecting a light source of one MFD to an optical component or fiber with another MFD. In this embodiment the fiber has a length L and L<100 m. Preferably L<50 m, for example 0.2 m to 20 m. In some embodiments 0.2 m≤L≤2 m. According to at least one embodiment the optical fiber 10 comprises a Cl doped silica glass core 20 and F doped silica cladding 40 surrounding the core 20. However, in other embodiments, the cladding 40 may be, for example, pure silica, or silica doped with boron.

More specifically, the optical fiber 10 includes a core 20, and a cladding with a constant outer diameter surrounding the core 20. The core 20 comprises two core regions: a constant core region 22 and tapered core region 24 situated adjacent to the constant core region. The term "constant outer diameter" as used herein refers to the fiber having an outer cladding diameter variation along the length of less than 3 microns.

The core region 22 (also referred to herein as the constant core segment, or constant core region 22) has a length $L_1$, for example $L_1>10$ cm (and preferably $L_1>12$ cm, or $L_1>15$ cm), a substantially constant maximum refractive index delta $\Delta_0$, and substantially constant outer diameter $D_0$ along the length $L_1$. The term "substantially constant", as used herein means that the diameter $D_0$ and the maximum refractive index delta $\Delta_0$ of the core region 22 may have small variations, i.e., variations within typical manufacturing tolerances. The core region 22 has a constant maximum refractive index. The term "constant maximum refractive index" refers to herein the fiber core having a maximum refractive index variation along the length of less than 10 percent. In some embodiments, the fiber core region 22 has a maximum refractive index variation along the length of less than 5 percent.

The tapered core region 24 of the fiber 10 has a length $L_2$ of less than 5 cm and is situated adjacent to the first fiber end face 12 of the fiber. The tapered core region 24 has a changing outer core diameter Dc along its length $L_2$. In some embodiments, the fiber has an outer diameter variation along the length of less than 1 micron. In some embodiments, for example, 15 cm≤$L_1$≤50 m and $L_2$<3 cm. In some embodiments $L_2$<2 cm, for example 2 mm to 1 cm, or 2 mm to 5 mm. The tapered core region 24 has a maximum refractive index delta $\Delta_C$ at each position z along the length $L_2$ of the tapered region, such that $\Delta_c$ changes along the length $L_2$ of the tapered core region 24.

The exemplary optical fiber 10 has a constant outer cladding diameter. The term "constant outer diameter" refers to herein the fiber having an outer diameter variation along the length of less than 3 microns.

The core 20 has a maximum outer core diameter $D_{max}$ in the tapered core region 24, and an outer diameter $D_0$ in constant region of the fiber—i.e., in the core region 22, for example, at or adjacent to the end face 14. Preferably the tapered core region 24 has an adiabatic taper—i.e., the diameter of the core Dc changes adiabatically. In other embodiments the taper profile (change in Dc along the length of the fiber) of the tapered core region 24 is linear, parabolic, or exponential. In some embodiments the taper is a Gaussian taper. The core 20 contains chlorine (Cl), and the maximum Cl concentration in the core is between 0.5 wt % and 5 wt %, for example 1 wt % to 5 wt %, or 1.1 wt % to 5 wt %, or 1.2 wt % to 5%. or 1.3 wt % to 5%. In this embodiment core 20 is constructed such that: $D_{max} > D_0$. In some embodiments 5 µm≤$D_0$≤11 µm, 8 µm≤$D_{max}$≤50 µm, 0.005%≤$\Delta_0$≤1% (for example, 0.05%≤$\Delta_0$≤0.6%, or 0.2%≤$\Delta_0$≤1%), and the refractive index delta Δc at a location corresponding to the maximum diameter maximum $D_{max}$ is smaller than $\Delta_0$. In some embodiments Δc (at $D_{max}$) is <$\Delta_0$, for example $\Delta_c$ (at $D_{max}$)<0.9$\Delta_0$, or Δc (at $D_{max}$)<0.8$\Delta_0$. In some embodiments |Δc (at $D_{max}$)| is <0.7$\Delta_0$, for example |Δc (at $D_{max}$)| is <0.5$\Delta_0$, and in some embodiments |Δc (at $D_{max}$)| is ≤0.2$\Delta_0$.

In some embodiments, $\Delta_0$−Δc (at $D_{max}$)>0.05%. For example, according to some embodiments $\Delta_0$−Δc (at $D_{max}$)≥0.08%, or $\Delta_0$−Δc (at $D_{max}$)≥0.1%, or $\Delta_0$−Δc (at $D_{max}$)≥0.12. In some embodiments, 0.35%≥$\Delta_0$−Δc (at $D_{max}$)≥0.05%.

According to some embodiments, 10 microns/mm≤ ($D_{max}$−$D_0$)/$L_2$≤100 microns/mm. According to some embodiments, 14 microns/mm≤($D_{max}$−$D_0$)/$L_2$≤86 microns/mm. According to some embodiments, 14 microns/mm≤ ($D_{max}$−$D_0$)/$L_2$≤35 microns/mm.

The constant core region 22 has a mode field diameter of $MFD_0$. In some embodiments, $MFD_0$ is similar to that of the standard single mode fiber, for example $MFD_0$ is between 8 to 10 µm at 1310 nm, and between 9.5 to 11.5 µm at 1550 nm. In some fiber embodiments, $MFD_0$ is smaller than the standard single mode fiber, for example $MFD_0$ is between 4 to 8 µm at 1310 nm, and between 5 to 9 µm at 1550 nm.

In the tapered core region 24 the mode field diameter MFD is expanded from the mode field diameter $MFD_0$ of the constant core region 22 to a lager diameter. The fiber's maximum mode field diameter $MFD_{MAX}$—i.e., MFD corresponding to $D_{max}$, is, for example, between 8 µm to 50 µm at 1310 nm, and between 8.5 to 50 µm at 1550 nm. The maximum MFD may be, for example, at one end of the tapered core region 24, e.g., end face 12. In the embodiments described herein $MFD_{MAX} > MFD_0$, for example $MFD_{MAX} \geq 1.5$ $MFD_0$, or $MFD_{MAX} \geq 2$ $MFD_0$. In some embodiments, for example, 15 $MFD_0 \geq MFD_{MAX} \geq 1.5$ $MFD_0$; and in some embodiments 15 $MFD_0 \geq MFD_{MAX} \geq 2$ $MFD_0$.

Figure 1B:
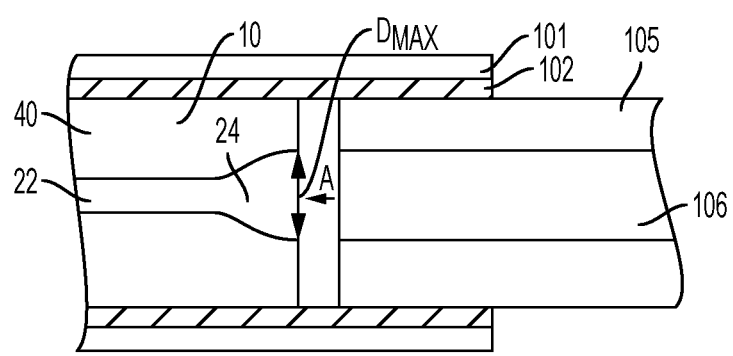
FIG. 1B is a schematic cross-sectional view of an embodiment of a fiber coupler embodiment that comprises the optical fiber of FIG. 1A.

FIG. 1B is a schematic cross-sectional view of an fiber coupler embodiment that comprises the optical fiber 10. The tapered core region 24 of the optical fiber 10 facilitates another optical fiber to the optical fiber 10 as shown, for example, in FIG. 1B. As shown in FIG. 1B the fiber coupler 100 comprises: (i) a housing 101; (ii) a ferrule 102 situated inside the housing 101, and the optical fiber 10 situated within the ferrule 102. The ferrule 102 is structured to receive and support at least a portion of another optical fiber 105 therein. When the optical fiber 105 is moved (see direction of arrow A) such that it is situated adjacent to the optical fiber 10, the two optical fibers are coupled to one another. The optical fiber 105 has a core 106, such that the mode field diameter of the two fibers at the adjacent end faces match one another (i.e., are substantially same, or within plus or minus 1 µm of each other).

Figure 2A:
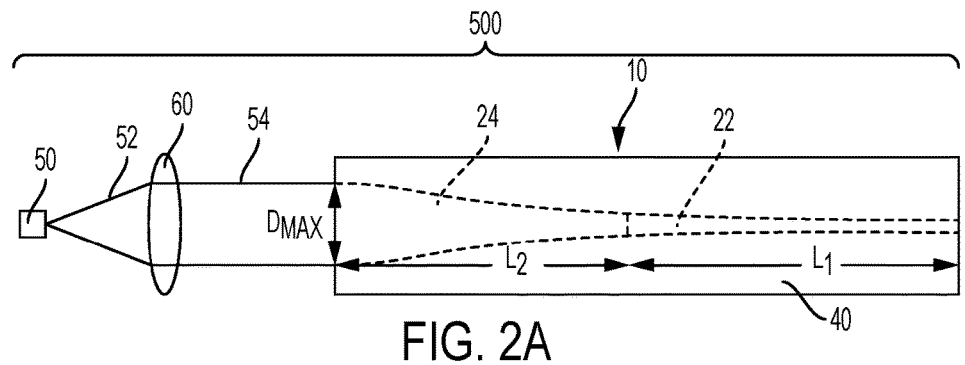
FIGS. 2A, 2B and 2C are schematic illustrations of three embodiments of an optical system that includes the optical fiber of FIG. 1A coupled to a laser source.

The tapered core region 24 of the optical fiber 10 also facilitates coupling a laser source 50 to the optical fiber 10 as shown, for example, in the embodiment of FIG. 2A. The laser source 50 can be, for example, a SiP laser or another type of semiconductor laser. These lasers have normally very small mode field diameter and high numerical aperture, which makes it difficult to directly couple the light into an ordinary single mode fiber. To enable efficient coupling to an optical fiber through the tapered end, in this embodiment, the laser beam 52 is collimated first by an optical component 60 to enlarge the beam diameter. Then the collimated beam 54 is coupled into the tapered core region 24 of the fiber 10 (i.e., the collimated light beam 54 is incident on the fiber end that corresponds to the core region that has a larger core diameter $D_{max}$. The fiber 10 is designed to have numerical aperture (NA) and MFD that match those of the light source. Matched MFDs means that the mode field diameter MFD of the optical fiber's end face facing the light source appearing immediately in front of it (e.g., fiber end face that faces component 60 or 60' shown in FIGS. 2A, 2B and 2C) is within 15%, and preferably within 10% of the MFD of that component. Some embodiments of the light source may be, for example, a Silicon photonic (SiP) transmitter, for example a SiP laser. FIG. 3 illustrates the change in MFD at 1310 and 1550 nm wavelengths, in µm, as a function of the outer core diameter for the optical fiber 10 of FIG. 1. Preferably, the core diameter taper in region 24 is designed to have an adiabatic transition to minimize the light propagation loss through the taper. That is, the mode field conversion occurs in the wider portion of the core 20 (in the taper core region 24), and the adiabatic shape or substantially adiabatic shape of the core region 24 provides nearly loss-less transmission of light. In some embodiments described herein the light loss within the taper core region 24 is less than 1 dB, and in some embodiment less than 0.5 dB, or even 0.2 dB or less. Taper loss can be measured by standard techniques in the industry such as launching light into the core at the input end of an optical fiber and measuring light coming out of the core at the end of the fiber using a power meter and comparing it to a fiber having a taper at the end of the fiber. The change on the core diameter Dc within the adiabatic region allows the first optical mode (LP01) to be confined in the taper core region 24, without conversion to higher-order modes, or without radiating out through the cladding, and the length of the adiabatic region (taper length $L_2$) should be long enough to achieve that purpose. Preferably, the adiabatic transition is such that that the change in core diameter satisfies the following condition:

$$\frac{dD}{dz} \leq \frac{Dc}{\lambda}(n_{eff} - n_{cl}) \tag{1}$$

where Dc is the core diameter in the core region 24 at location z within the length $L_2$, λ is the transmission wavelength, $n_{eff}$ is the effective index of the fundamental mode LP01, and $n_{cl}$ is the refractive index of the cladding at the wavelength λ.

In some embodiments the core taper (core radius shape) is approximately adiabatic (also referred to herein as a substantially adiabatic taper), such that that the change in core diameter satisfies the following condition $$\frac{dD}{dz} \leq 2\frac{Dc}{\lambda}(n_{eff} - n_{cl}) \quad (2)$$

According to the embodiments described herein λ=1310 nm. However, in other embodiments λ may be 1550 nm or 980 nm.

It is noted that the optical component 60 depicted in FIG. 2A may comprise a single lens element or a plurality of lens elements. It may include, for example, a spherical lens, an aspheric lens, a cylindrical lens, an anamorphic lens, or a GRIN lens.

Figure 2B:
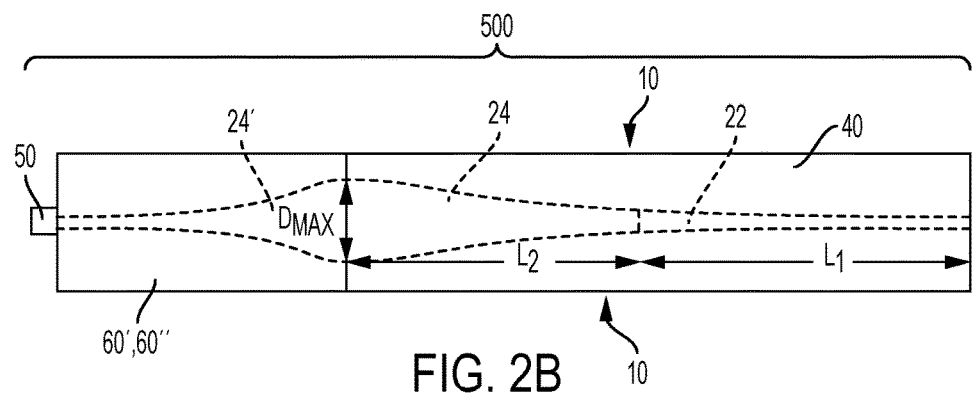
Figure 3:
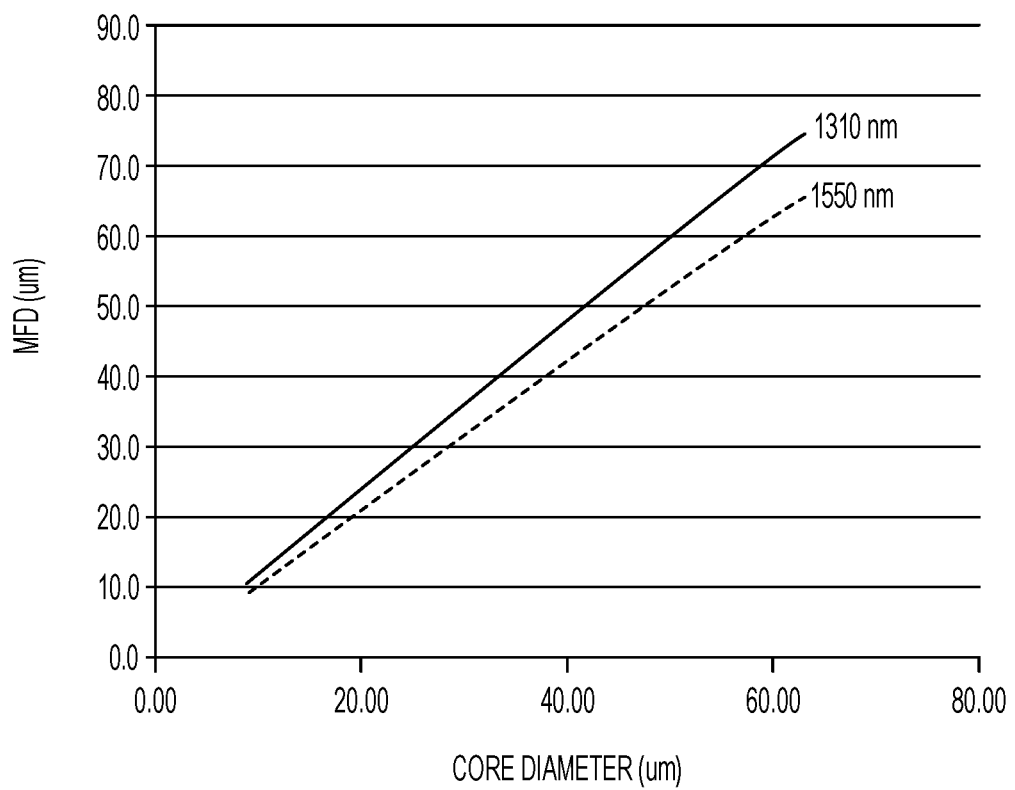
FIG. 3 illustrates the change in mode field diameter (MFD) at 1310 and 1550 nm wavelengths, in μm, as a function of the outer core diameter for the optical fiber of FIG. 1A.

In another embodiment, as shown in FIG. 2B, the optical component 60 may be a tapered coupling element 60' (i.e., a waveguide with a tapered core) that is butt coupled to the laser source 50 as shown for example in FIG. 2B.

As shown in FIG. 2B the light beam provided by the laser source 50 is expanded as it propagates through the coupling element 60' (also referred to herein as transition waveguide 60'). The transition waveguide 60' may be, for example, a transition optical fiber 60'' with a tapered core 24'. The expanded, light beam then launched into the tapered coupling element 60' which couples into an optical fiber 10 as illustrated in FIG. 2B. The smaller side of the tapered coupling element 60' such as transition optical fiber 60'' with a tapered core 24' has similar characteristics as that of the receiving optical fiber 10, and it can be fusion spliced or attached to the receiving optical fiber 10. Having a similar or the same outer-diameter between the smaller side of the tapered coupling element 60' and the light receiving optical fiber 10 facilitates alignment and attachment to the optical fiber 10 to the tapered coupling element 60 (e.g., transition optical fiber 60'').

In between the first optical element (lens 60 or the coupling element 60') and the optical fiber 10, the beam size is expanded. This offers large spatial alignment tolerances, enabling passive alignment in the field.

Figure 2C:
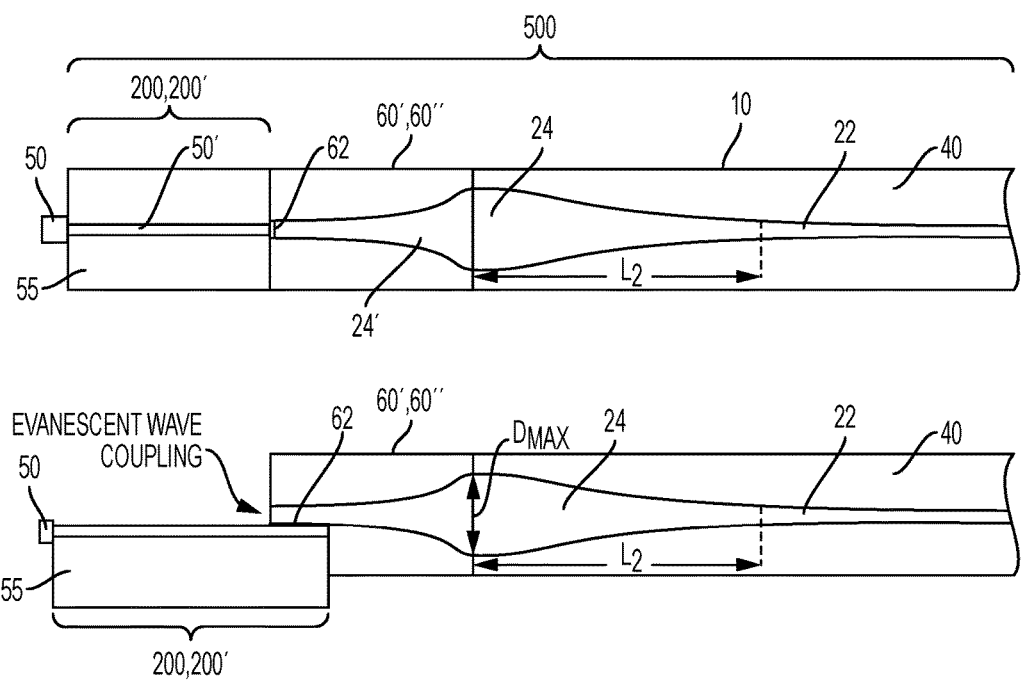

In another embodiment as shown in FIG. 2C, the optical component 60 is a tapered coupling element 60' (e.g., a transition optical fiber 60'' with a tapered core 24') that has one end coupled to light source 50 a waveguide' (e.g., via silicon photonic SiP waveguide 50') by means of evanescent wave coupling at an interface 62. The transition optical fiber 60'' with a tapered core 24' has a similar structure to the optical fiber 10, and can be manufactured in a similar manner. The tapered core region 24' comprises a maximum core refractive index that decreases along the length of the tapered core region; and (b) silica based cladding 40 surrounding the fiber core.

The tapered coupling element 60' is preferably factory aligned and attached to the laser source 50, (e.g., a SiP laser) or to a SiP waveguide 50'. The tapered coupling element 60' may be passively aligned or actively aligned relative to the SiP waveguide 50'. Passive alignment using vision systems is preferred as a factory alignment method. Active alignment can increase the alignment accuracy if needed. As illustrated in FIG. 2C, according to some embodiments the laser beam from a transmitter (light source) is guided though a SiP waveguide 50' and then coupled by evanescent wave coupling at the interface 62 to the tapered transition waveguide 60', which is coupled into an optical fiber 10. The evanescent wave coupling transfers light from the small SiP waveguide 50' to the larger transition waveguide (the tapered coupling element 60'), which facilitates the coupling from the laser source 50 to the tapered fiber 10.

Figure 4:
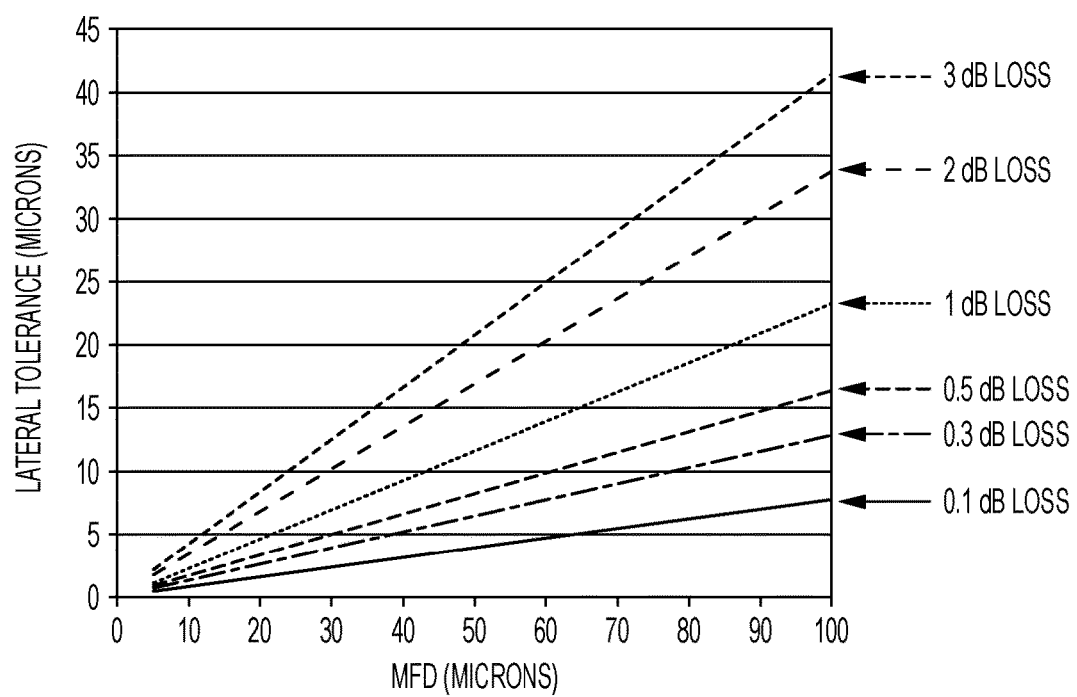
FIG. 4 shows calculated spatial alignment tolerances for a single mode laser beam for different expanded beam sizes (different MFDs), at a wavelength of 1550 nm.
Figure 5:
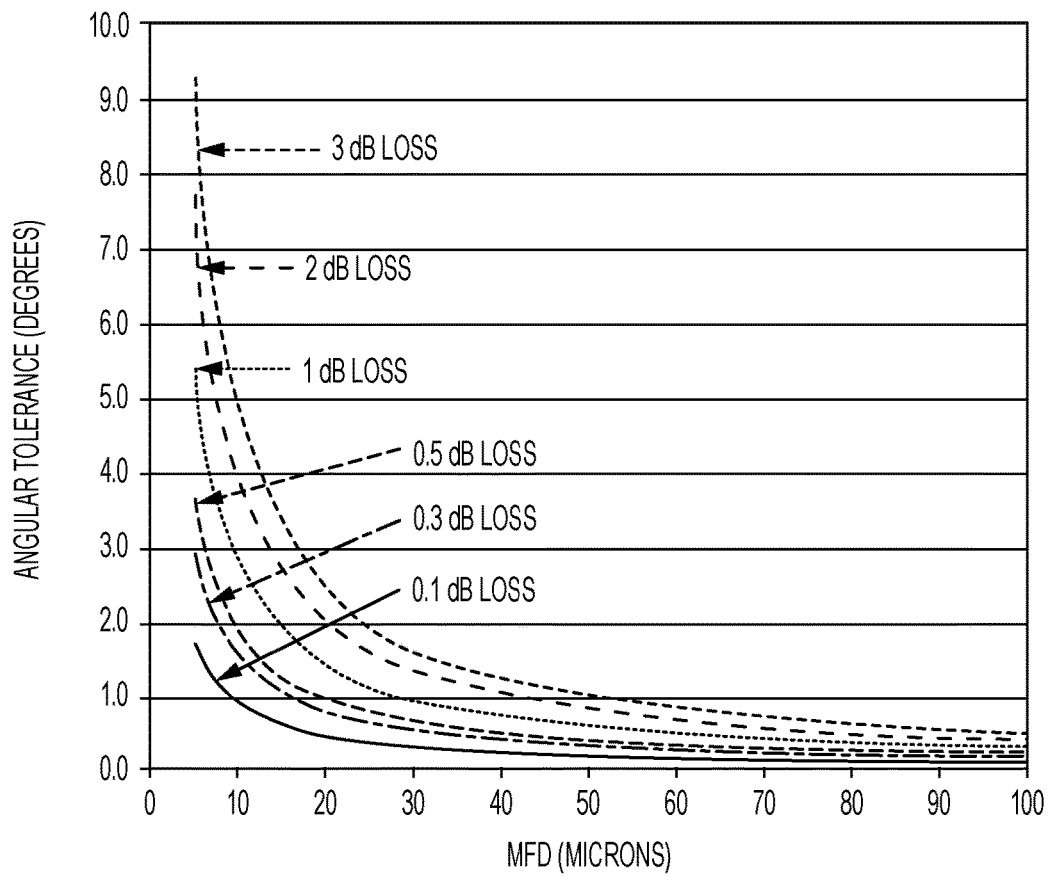
FIG. 5 shows calculated angular alignment tolerances for a single mode laser beam for different expanded beam sizes, at a wavelength of 1550 nm.

In between the tapered coupling element 60' (e.g., transition optical fiber 60'') and the optical fiber 10, the beam size is expanded. This offers large spatial alignment tolerances, enabling passive alignment in the field. By way of example, FIGS. 4 and 5 show calculated spatial and angular alignment tolerances for a single mode laser beam for different expanded beam sizes, at a wavelength of 1550 nm, and the corresponding losses (dB) due to manufacturing misalignments. As can be seen in FIGS. 4 and 5, there is a trade-off between spatial and angular alignment tolerance. For a larger expanded beam size, spatial translation alignment tolerance increases linearly (FIG. 4), but angular alignment tolerance decreases nonlinearly (FIG. 5). An optimal expanded beam size is chosen to satisfy coupling loss requirements (loss, dB) considering both achievable spatial and angular alignment tolerances. For an exemplary case of single mode laser beam, an expanded beam size (MFD) between 20 μm and 100 μm, in some embodiments between 20 μm and 70 μm and in other embodiments between 30 μm and 60 μm, yields reasonable alignment tolerances, and also greatly improves the connector's tolerance to dust particles. (It is noted that the optical design configuration shown in FIG. 2C can also work for coupling into few-mode or multimode fibers, and the laser beam does not have to be circularly symmetric. A similar optical design can be used to couple between an array of laser/VCSEL sources to a multicore fiber, where the lens system design needs to be telecentric and the tapered coupler element needs to have multiple cores.)

Process for Making Tapered Core Fibers

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

According to some embodiments, a method of forming a tapered core in a glass optical fiber comprises a chlorine doped core surrounded by a cladding comprises the step of applying heat for a cumulative duration of less than 60 seconds (e.g., 50 seconds or less, 45 seconds or less, 30 seconds or less) to a region of the optical fiber having a mode field diameter $MFD_0$, thereby diffusing chlorine from the core of the optical fiber into the cladding of the optical fiber, and expanding the mode field diameter such that the fibers maximum mode field diameter $MFD_{MAX}$ of the fiber (i.e., MFD corresponding to $D_{max}$) is greater than $MFD_0$, for example $MFD_{MAX} \geq 1.5$ $MFD_0$, or $MFD_{MAX} \geq 2$ $MFD_0$. In some embodiments, for example, 15 $MFD_0 \geq MFD_{MAX} \geq 1.5$ $MFD_0$; and in some embodiments 15 $MFD_0 \geq MFD_{MAX} \geq 2$ $MFD_0$. In some embodiments, the maximum (expanded) mode field diameter $MFD_{MAX}$ is, for example, between 8 μm to 50 μm mat 1310 nm, and between 8.5 μm to 50 μm mat 1550 nm.

According to some embodiments, a method of forming a tapered core in a glass optical fiber comprises a chlorine doped core surrounded by a cladding comprises the step of applying heat for a cumulative duration of less than 60 seconds to a region of the optical fiber, thereby diffusing chlorine from the core of the optical fiber into the cladding of the optical fiber, and expanding the mode field diameter MFD by at least 3 microns. According to some embodiments a method of forming a tapered core in a glass optical fiber comprises:

applying heat for a cumulative duration of less than 60 seconds to a region of the optical fiber, thereby diffusing chlorine from the core of the optical fiber into the cladding of the optical fiber, and expanding the mode field diameter MFD by at least 3 microns; and cleaving the optical fiber in the region of the fiber where the mode field MFD was expanded by at least 3 microns.

Figure 6:
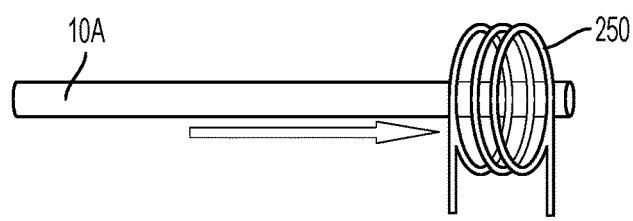
FIG. 6 illustrates schematically one method for making a tapered core fiber by a process of thermal diffusion.

More specifically, a tapered core profile (tapered core region 24) can be made by thermal diffusion of the core dopants to the cladding and/or cladding dopants towards or into the fiber core. FIG. 6 illustrates schematically one embodiment an exemplary process for making a core region 24. According to this embodiment an initial fiber 10A (with constant core diameter and constant maximum core refractive index delta) is placed next to a heating element 250 to create a fiber 10 having a core region with a taper (tapered core region 24). The heating element 250 can be an electric resistant coil, a gas burner, or a laser source. According to one embodiment the optical fiber is held by a holding fixture (not shown) and the heating element surrounds the fiber 10A. Preferably the heat source heating element 250 is evenly distributed around the fiber to create a radially symmetric dopant diffusion profile. In this embodiment, the fiber end region of the fiber 10A is heated by a heating element to a desired temperature (fiber dopant diffusion temperature Td), for example 1500° C.≤Td<2200° C. We discovered that when Td<2200° C., the undesirable fiber deformation due to heat is minimized. Preferably Td≤2100° C., to avoid or minimize significant undesired deformation of the fiber. According to some embodiments, 1600° C.≤Td≤2100° C., because we discovered dopant diffusion (e.g., diffusion of CO can occur at a very fast rate within the fiber at theses temperatures, creating the desired taper in the fiber core in fiber region 24, without the undesirable fiber deformation. For example, in some embodiments, 1700° C.≤Td≤2100° C., and in some embodiments some embodiments, 1700° C.≤Td≤2000° C. In some embodiments, the temperature Td is below the cladding glass softening point to avoid undesirable fiber deformation. The fiber moves through the hot zone (temperature Td) with a speed profile that controls the amount of dopant diffusion (out of the fiber core and/or out of the cladding) along the fiber. Alternatively, the fiber stays stationary and the heating element moves along the fiber length, for a predetermined distance. In some other embodiments, the temperature is higher than the cladding's softening point. In these embodiments, the total exposure time of the fiber portion corresponding to the core region 24 to the temperature Td is less than 1 minute in order to avoid significant undesirable deformation to the fiber (e.g., bends, or changes in the outer radius), and in some embodiments the total (or cumulative) exposure time to the temperature Td is 1 sec to 45 sec, or 1 sec to 30 sec Although the step of applying heat (subjecting the fiber to the temperature Td) may be done intermittingly or as a single continuous step, it is performed for cumulative duration of less than 60 seconds, e.g., for a total time of 1 sec to 45 sec, or even 1 sec to 30 sec.

In some embodiments the heat source (e.g., heating element 250) may be placed away from the edge of the fiber 10A—i.e., somewhere adjacent to or around the middle of the fiber 10A. In one embodiment, the optical fiber with a chlorine doped core is held by a holding fixture and the heating element 250 surrounds the fiber 10A in a middle region of the fiber. Preferably the heat source heating element 250 is evenly distributed around the fiber to create a radially symmetric dopant diffusion profile. In this embodiment, the fiber end region of the fiber 10A is heated by a heating element to a desired temperature (fiber dopant diffusion temperature Td), for example 1500° C.≤Td<2200° C. and the fiber is moved relative to the heat source (or the heat source is moved relative to the fiber, to expand the mode field diameter of the fiber core (through dopant diffusion), through dopant diffusion, in a middle region of the fiber. In some embodiments 1500° C.≤Td<2100° C., and in some embodiments 1700° C.≤Td<2100° C., for example 1500° C.≤Td<2000° C.

According to some embodiments a method of forming a low loss taper in a glass optical fiber comprising greater than 0.5 wt % chlorine in a core, the core having an initial mode field diameter MFD (at 1550 nm) and is being surrounded by a cladding, comprises the steps of:

(a) expanding the initial core MFD at 15550 nm by at least 3 microns by applying heat to said optical fiber for less than 60 seconds in cumulative duration, thereby diffusing chlorine from the core of the optical fiber into the cladding of the optical fiber;

(b) cleaving said optical fiber at a location where the MFD was expanded by at least 3 microns.

According to some embodiments, a method of forming an adiabatic taper or a substantially adiabatic taper in an optical fiber comprises the steps of: aligning and abutting a cleaved end of a first optical fiber having a small MFD (e.g., MFD≥5 μm, for example between 5 and ≤11 μm, at 1550 nm) and a cleaved end of a second optical fiber having a large MFD (relative to that of the first fiber) adjacent a heat source to form a splice seam;

offsetting the splice seam a predetermined distance from the center of the heat region of the heat source;

applying heat in the heat region to splice the fibers and expand the MFDs;

monitoring the decrease in splice loss during the heating step;

terminating the application of heat when the splice loss is at or sufficiently close to a target loss;

cleaving the first optical fiber where heat from the heat source is delivered to the first optical fiber by the center of the heat region, wherein the step of applying heat (i.e., the step of maintaining the fiber at temperature Td) is less than 1 minute (total, or cumulatively) in duration, thereby diffusing one or more dopants dopant (e.g., CO from the core of the first and second optical fibers into the respective claddings of the first and second optical fibers.

According to another embodiment, a method of forming an adiabatic taper or a substantially adiabatic taper in an optical fiber, the method comprises the steps of:

cleaving one end of an optical fiber having a small MFD (e.g., MFD≥5 μm, for example between 5 and ≤11 μm, at a wavelength of 1550 nm) and Cl doped core;

applying heat to a segment of fiber with a predetermined length from the cleaved end by moving the fiber segment through the heat source;

controlling fiber moving velocity profile to expand the MFD adiabatically from inner end of the segment towards the cleaved end, wherein the step of applying heat is performed at a temperature Td for a time t that is less than 1 minute total (cumulative) in duration. Preferably, according to some embodiments 1500° C.≤Td<2200° C. According to some embodiments 1600° C.≤Td≤2100° C. to facilitate the optimum diffusion of dopants within the fiber core while minimizing or avoiding undesirable fiber deformations. According to some embodiments t is 45 seconds or for example, 30 seconds or less, 20 seconds or less, 10 seconds or less, or fort of 1-10 seconds. According to some embodiments t is 1 to 45 sec, or 5 to 45 sec.

According to another embodiment, a method of forming an adiabatic taper or a substantially adiabatic taper in an optical fiber having Cl doped core, the method comprises the steps of:
(i) removing fiber coating of a fiber segment with a predetermined length situated in the middle of the optical fiber (i.e., away from the fiber end faces);
(ii) applying heat to the fiber segment through the heat source so that the fiber segment is exposed to the temperature Td for a time t that is less than 1 minute total (cumulative) in duration and diffusing Cl from the Cl doped core;
(iii) controlling fiber moving velocity profile to expand the MFD adiabatically from both ends of the segment towards middle of the segment;
(iv) cleaving the fiber segment in the middle to form two adiabatic tapers.

In some embodiments the application of heat provided for the time t that is 45 seconds or less, 30 seconds or less, 20 seconds or less, 10 seconds or less, or 1 to 10 seconds. Preferably, according to some embodiments 1500° C.≤Td<2200° C. According to some embodiments 1500° C.≤Td<2100° C., and preferably 1600° C.≤Td<2100° C. to facilitate the optimum diffusion of dopants within the fiber core within a minimum amount of time to minimize or avoid undesirable fiber deformations.

For example, a highly localized high temperature heat source, such as an arc fusion splicer (e.g., model no. FSU 975 manufactured by Ericsson Incorporated), a tungsten filament, or a $CO_2$ laser can be used to expand the mode field diameter of the optical fiber 10 and thus form the tapered core region 24 (e.g., adiabatic taper) in the Cl doped fiber core. In one embodiment, the fiber with a Cl doped core ($0.3\% \leq \Delta_0 \leq 2.5\%$, Cl concentration about 0.2 wt % to about 2.5 wt %) and silica based cladding (e.g., F doped silica cladding) is stripped of its primary coating over a portion of its length exposing a small diameter core 20 bounded by a cladding 40 and then cleaved. Another fiber 10' (with a larger mode field diameter) is then stripped of its coating, cleaved, and the two fibers (not shown) are in the fusion splicer such that the two cleaved end face each other and the cores are in a proper alignment. The arc is applied such that so that a larger portion of the smaller Cl doped fiber 10 lies in arc region or heat region than that of large mode field diameter fiber. That is, in this embodiment the arc region is offset from the splice seam, rather than being directly over the splice seam 50. The two fibers 10 and 10' are initially fused at splice seam by delivery of an initial arc discharge current, for example, of approximately 10 to 20 mA for an arc time of approximately 2 seconds. Additional arc is intermittently applied over arc region to maintain the fiber temperature at the temperature Td, in order to diffuse Cl, within the core of small mode field diameter fiber 10 residing in arc region, to create a tapered region 24. In the exemplary embodiments described herein fiber temperature is maintained at the temperature Td over total (or cumulative) time of less than 1 minute. In some embodiments the optical fiber is subjected to temperature Td for a total of 5 sec to 45 sec. The resultant fused fiber is then cleaved resulting in fiber 10 with Cl doped core that has a tapered region similar to that shown in FIGS. 1 and 2A and 2B. Without being bound by theory, we believe that because Cl (in the core) and F (in the cladding) both have only one bond, these dopants act synergistically, quickly moving in opposite direction and replacing one another, thus surprisingly and advantageously resulting in making the desired tapered core regions 24 at lower temperatures (<2200° C., preferably ≤2100° C.), and faster rate than what can be achieved by fibers with Ge doped cores. However, a fiber with Cl doped core, rather than Ge dope core, can be subjected to lower temperature Td, for less than a minute (e.g., t=45 sec or less) to result in the desired tapered core region, even if the cladding 40 of fiber 10 is pure silica instead of F doped silica. That is, our models indicate that Cl diffuses in silica much faster and at lower temperatures than Ge. A short exposure (<1 min, and preferably ≤50 sec) to temperature Td minimizes the effects of undesired heat induced changes in the fiber. Thus, according to some embodiments, the silica based core 40 can be either pure silica, or (preferably) silica doped with F.

Various embodiments will be further clarified by the following examples. Table 1 discloses fiber core parameters before the fiber is subjected to a temperature Td, while Table 2 shows fiber core parameters of the tapered core region 24, after the taper is created by subjecting the fiber to the temperature Td for 1 sec to 45 seconds.

TABLE 1

| Fiber Example | Initial maximum core delta, % | Initial physical core diameter, microns | Initial MFD at 1310 nm, microns | Initial MFD at 1550 nm, microns |
| --- | --- | --- | --- | --- |
| 1 | 0.34 | 8.8 | 9.2 | 10.4 |
| 2 | 0.34 | 8.8 | 9.2 | 10.4 |
| 3 | 0.34 | 8.8 | 9.2 | 10.4 |
| 4 | 0.34 | 8.8 | 9.2 | 10.4 |
| 5 | 0.34 | 8.8 | 9.2 | 10.4 |
| 6 | 0.34 | 8.8 | 9.2 | 10.4 |
| 7 | 0.34 | 8.8 | 9.2 | 10.4 |
| 8 | 0.34 | 8.8 | 9.2 | 10.4 |
| 9 | 0.31 | 9.0 | 9.6 | 10.9 |
| 10 | 0.31 | 9.0 | 9.6 | 10.9 |
| 11 | 0.31 | 9.0 | 9.6 | 10.9 |
| 12 | 0.31 | 9.0 | 9.6 | 10.9 |
| 13 | 0.31 | 9.0 | 9.6 | 10.9 |
| 14 | 0.31 | 9.0 | 9.6 | 10.9 |
| 15 | 0.31 | 9.0 | 9.6 | 10.9 |
| 16 | 0.31 | 9.0 | 9.6 | 10.9 |
| 17 | 0.38 | 8.2 | 8.7 | 9.8 |
| 18 | 0.38 | 8.2 | 8.7 | 9.8 |
| 19 | 0.38 | 8.2 | 8.7 | 9.8 |
| 20 | 0.38 | 8.2 | 8.7 | 9.8 |
| 21 | 0.38 | 8.2 | 8.7 | 9.8 |
| 22 | 0.38 | 8.2 | 8.7 | 9.8 |
| 23 | 0.38 | 8.2 | 8.7 | 9.8 |
| 24 | 0.38 | 8.2 | 8.7 | 9.8 |

TABLE 2

| Example | Final maximum core delta, % | Final physical outer core diameter, microns | Final MFD at 1310 nm, microns | Final MFD at 1550 nm, microns | Maximum taper slope (microns core diameter/mm fiber length) | Minimum taper length for linear slope, mm |
|---|---|---|---|---|---|---|
| 1 | 0.12 | 14.8 | 15.6 | 17.6 | 14.5 | 0.41 |
| 2 | 0.06 | 21.0 | 22.1 | 24.9 | 14.5 | 0.84 |
| 3 | 0.04 | 25.7 | 27.0 | 30.5 | 14.5 | 1.16 |
| 4 | 0.02 | 36.3 | 38.4 | 43.3 | 14.5 | 1.90 |
| 5 | 0.015 | 41.9 | 44.1 | 49.8 | 14.5 | 2.28 |
| 6 | 0.01 | 51.3 | 54.1 | 61.0 | 14.5 | 2.93 |
| 7 | 0.008 | 57.4 | 60.5 | 68.2 | 14.5 | 3.35 |
| 8 | 0.006 | 66.2 | 67.6 | 77.6 | 14.5 | 3.96 |
| 9 | 0.12 | 14.5 | 15.5 | 17.5 | 14.0 | 0.39 |
| 10 | 0.06 | 20.5 | 21.9 | 24.8 | 14.0 | 0.82 |
| 11 | 0.04 | 25.1 | 26.8 | 30.4 | 14.0 | 1.15 |
| 12 | 0.02 | 35.4 | 37.9 | 42.9 | 14.0 | 1.89 |
| 13 | 0.015 | 40.9 | 43.8 | 49.6 | 14.0 | 2.28 |
| 14 | 0.01 | 50.1 | 53.6 | 60.7 | 14.0 | 2.94 |
| 15 | 0.008 | 56.0 | 59.9 | 67.9 | 14.0 | 3.36 |
| 16 | 0.006 | 64.7 | 67.6 | 77.6 | 14.0 | 3.98 |
| 17 | 0.12 | 14.6 | 15.5 | 17.5 | 14.1 | 0.45 |
| 18 | 0.06 | 20.6 | 21.9 | 24.8 | 15.1 | 0.82 |
| 19 | 0.04 | 25.3 | 26.9 | 30.4 | 16.1 | 1.06 |
| 20 | 0.02 | 35.7 | 38.0 | 43.0 | 17.1 | 1.61 |
| 21 | 0.015 | 41.3 | 43.9 | 49.7 | 18.1 | 1.83 |
| 22 | 0.01 | 50.5 | 53.8 | 60.8 | 19.1 | 2.22 |
| 23 | 0.008 | 56.5 | 60.1 | 68.0 | 20.1 | 2.40 |
| 24 | 0.006 | 65.3 | 67.6 | 77.6 | 21.1 | 2.70 |

The optical fibers 10 of Table 2 exhibit taper induced loss of ≤0.2 dB at 1550 nm. For example, at least in some embodiments of fiber 10 the tapered region 24 of these fibers exhibits a taper induced loss of ≤0.2 dB at 1310 nm. For example, in at least in some embodiments of fiber 10 the tapered region 24 of these fibers exhibit a taper induced loss of ≤0.1 dB at 1310 nm.

Fiber Designs for Mode Filed Expansion

To make a tapered core region adjacent to one the end of an optical fiber jumper (such as fiber 10) the fiber's core refractive index in this region needs to be decreased gradually and the core diameter in this region needs to be increased gradually. This can be achieved by core dopant diffusion by heating the fiber end.

Although the Ge dopant that is used in most single mode fibers can diffuse when the fiber is heated, creating a tapered core region, in such fibers at temperatures below 2200° C. the required diffusion for the adequate mode field expansion will take very long time (many minutes or hours) because the diffusion coefficient of Ge is too low, making the process inefficient and expensive. If, however, a Ge doped fiber is subjected to a relatively fast heating time (1-2 min), the fiber needs to be heated to very high temperatures—i.e., above 2200° C. or above 2300° C., or even greater (the faster heating time, the higher the temperature), which creates undesirable fiber deformation(s), for example it creates fiber bends and/or significantly changes the outer diameter of the fiber.

Applicants realized that in order to increase the diffusion speed, without significantly deforming the fiber by heating it to very high temperatures, a fiber with Cl doped core having more than 0.5 wt % Cl should be used instead of typical fiber with Ge doped core. The exemplary fiber embodiments discussed herein thus utilize a Cl doped core, because Cl can diffuse easier and faster than Ge, at lower temperatures. Preferably, according to at least some embodiments the fiber utilizes a F doped cladding, because as Cl diffuses out toward the outer diameter of the fiber, the F simultaneously diffuses inward, toward the center of the fiber, and the two dopants (Cl and F) work synergistically to facilitate the fast creation of the tapered core region at smaller temperature Td, without causing fiber deformation (i.e., no unwanted bends, or significant changes in the outer diameter of the fiber).

Figure 7:
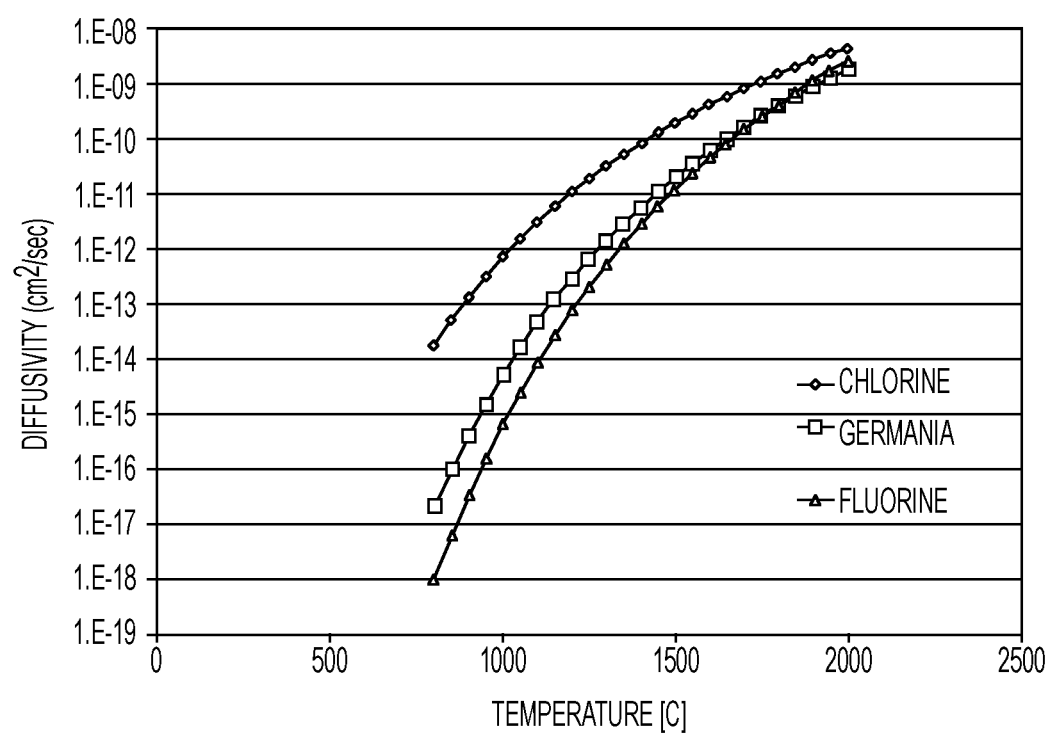
FIG. 7 illustrates diffusivity of Cl, Ge and F dopants in silica glass, as a function of glass temperature.

At the Td temperatures where Td is below 2100° C., (e.g., greater than 1500° C. and less than 2100° C., or not greater than 2000° C., for example 1500° C. to 2000° C., or 1600° C. to 2000° C., or 1700° C. to 2000° C.)., Cl dopant within the fiber core diffuses through silica much faster than Ge in the comparative fibers. FIG. 7 shows the diffusivity ($cm^2$/sec) of Cl, F, and Ge in pure silica glass for different temperatures (750° C.≤Td≤2000° C.). It is noted that at about 2100° C. chlorine's diffusivity into pure silica glass is about 2 times faster than that of germania. As shown in FIG. 7 at about 2000° C. chlorine's diffusivity into pure silica glass is about 2.4 times faster than that of germania. At 1900° C. chlorine's diffusivity into pure silica glass is about 3 times faster than that of germania. At 1700° C. chlorine's diffusivity into pure silica glass is about 5.5 times faster than that of germania, That is, this figure illustrates that the higher the temperature, the higher is the diffusivity. In the temperatures of interest (Td<2200° C., and more preferably Td<2100° C.) Cl diffuses through silica much faster than Ge, and at that range of temperatures the fiber encounters no significant deformation(s). Accordingly, in at least some embodiments, it is preferable that 1500° C.<Td<2100° C. because and at that range of temperatures the fiber encounters essentially no undesirable deformation(s).

When the fiber is subjected to the temperature Td (e.g., 1500° C.≤Td≤2100° C.), Cl in the fiber core starts to diffuse out of the core towards and into the cladding. The diffusion of the Cl lowers the maximum refractive index of the core and simultaneously increases the core outer diameter. In the embodiments where the cladding 40 comprises fluorine, when the fiber is subjected to the temperature Td the fluorine from the cladding also starts to diffuse into from the cladding into the core, further lowering the refractive index of the core. FIGS. 8A-19C illustrate modeled changes in the chlorine and fluorine doped concentration profiles of the exemplary step index optical fibers subjected to different temperatures Td, along with the changes in corresponding changes in refractive index profiles as a result of the diffusion of chlorine and fluorine species in the glass.

Figure 8A:
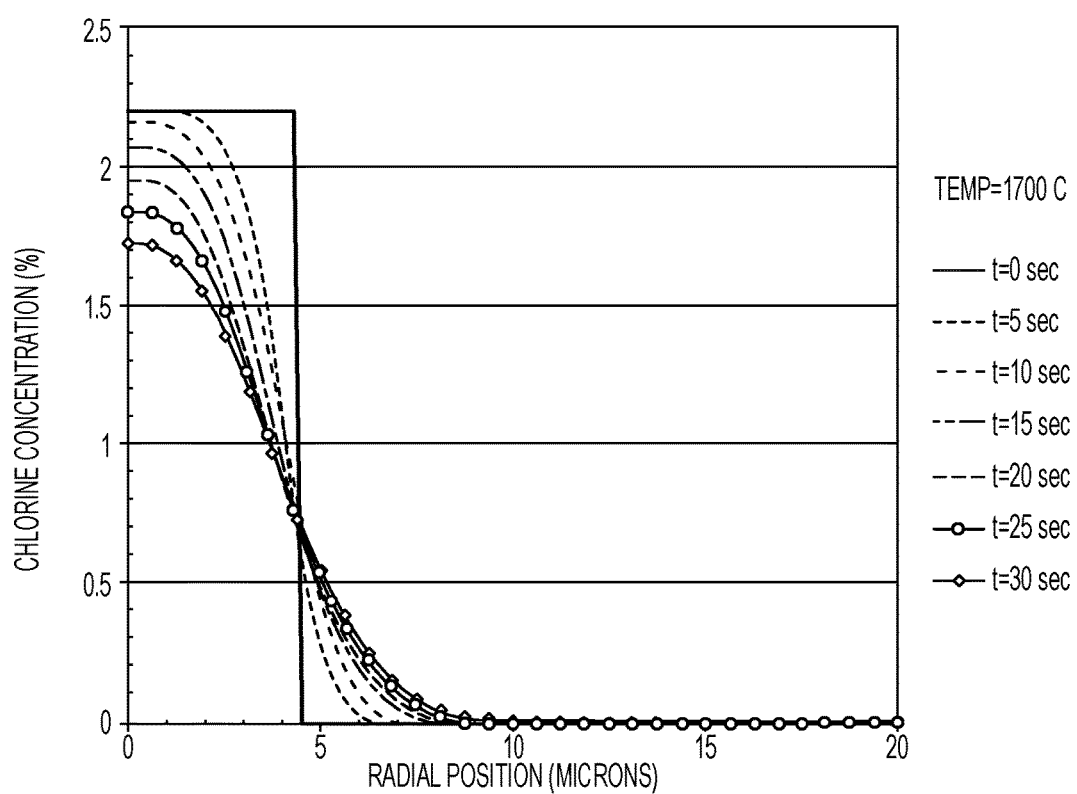
FIG. 8A illustrates evolution of chlorine profile (Cl concentration (wt %)) with exposure time at 1700° C. in a fiber having a core doped with chlorine and a cladding coped with fluorine.
Figure 8B:
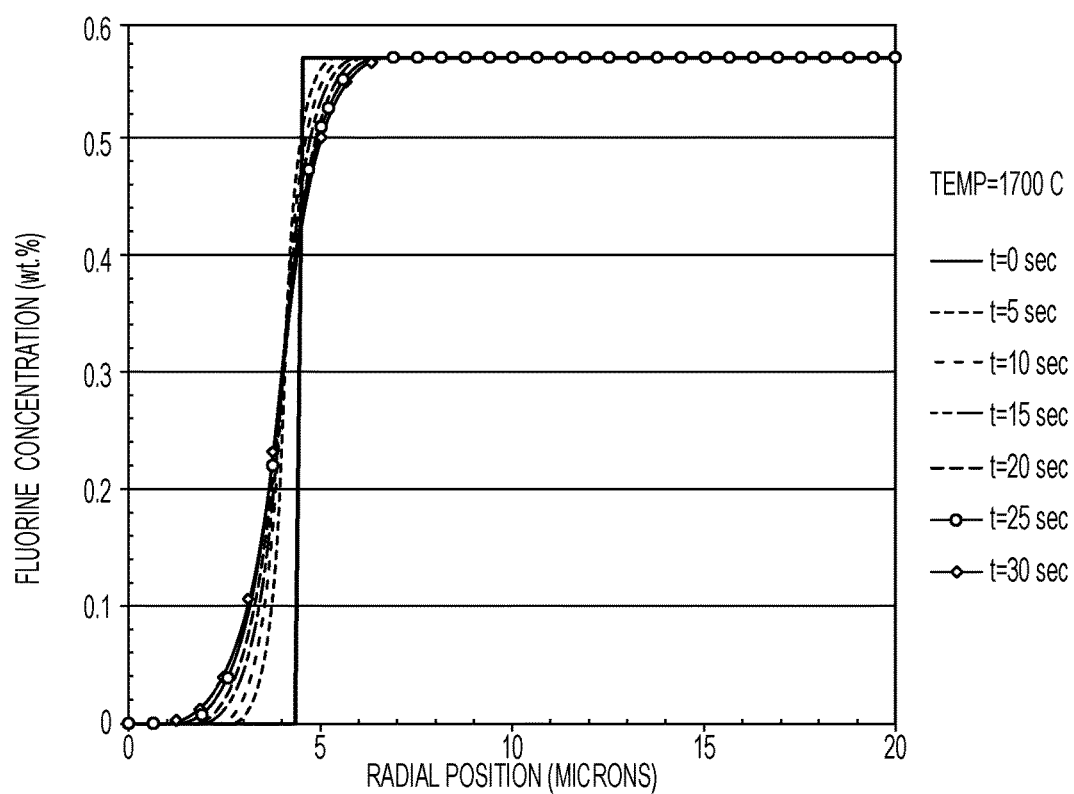
FIG. 8B illustrates evolution of fluorine profile (F concentration (wt %)) with exposure time at 1700° C. in fiber having core doped with chlorine and cladding doped with fluorine.
Figure 8C:
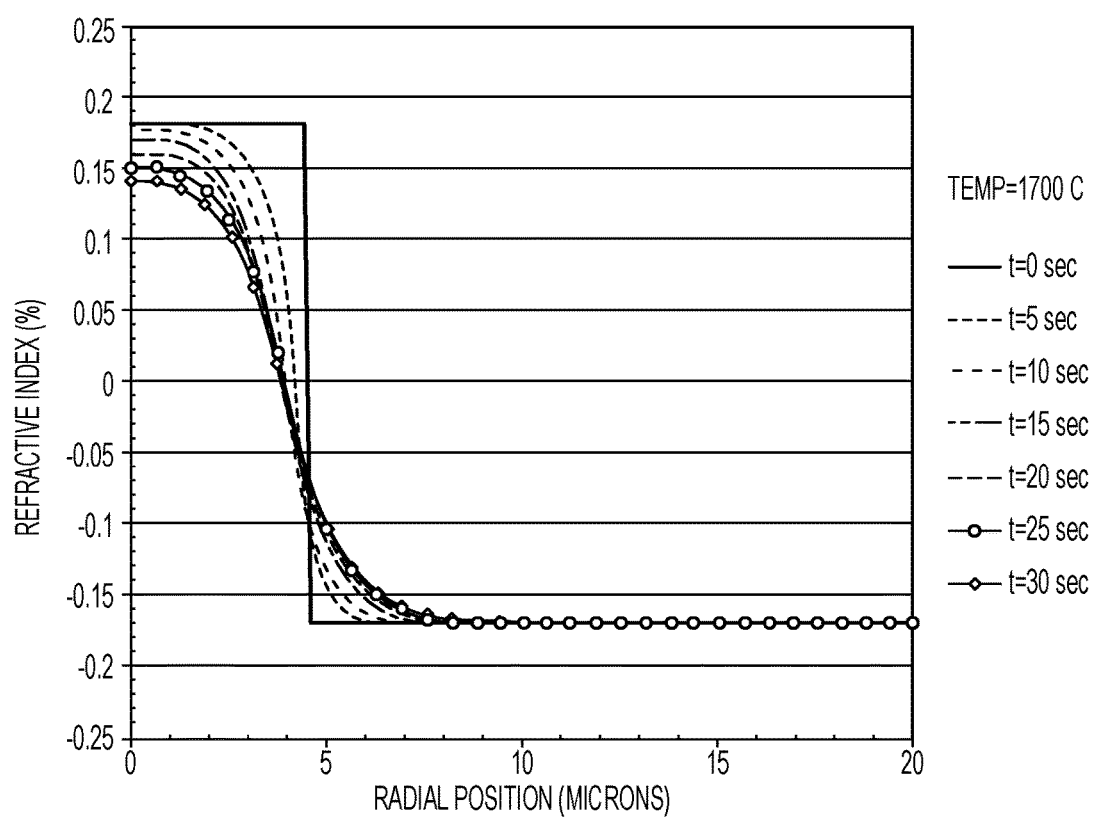
FIG. 8C illustrates evolution of refractive index profile with exposure time at 1700° C. in a fiber having core doped with chlorine and cladding doped with fluorine.

FIGS. 8A-8C illustrate changes in the Cl/F concentrations within fiber's core and cladding and changes in refractive index profile of the optical fiber when the optical fiber is subjected to at a temperature Td (where Td is above the softening point of the fiber cladding layer) as a function of time. More specifically, FIGS. 8A-8B illustrate how Cl and F diffuse in silica at a temperature Td=1700° C. as a function of time t (where t is total or cumulative time at a temperature Td) in a fiber having chlorine doped silica based core and fluorine doped silica based cladding. (In this embodiment 1 sec<t<1 min, e.g., 3 sec<t≤45 sec, or 5 sec<t≤45 sec, or 3 sec<t≤30 sec, or 5 sec<t≤30 sec). FIG. 8C illustrates the resultant relative refractive index delta profile of the fiber at location $D_{max}$ after specified cumulative time t (after fiber is treated at the temperature Td=1700° C. for these cumulative periods of time).

Figure 9A:
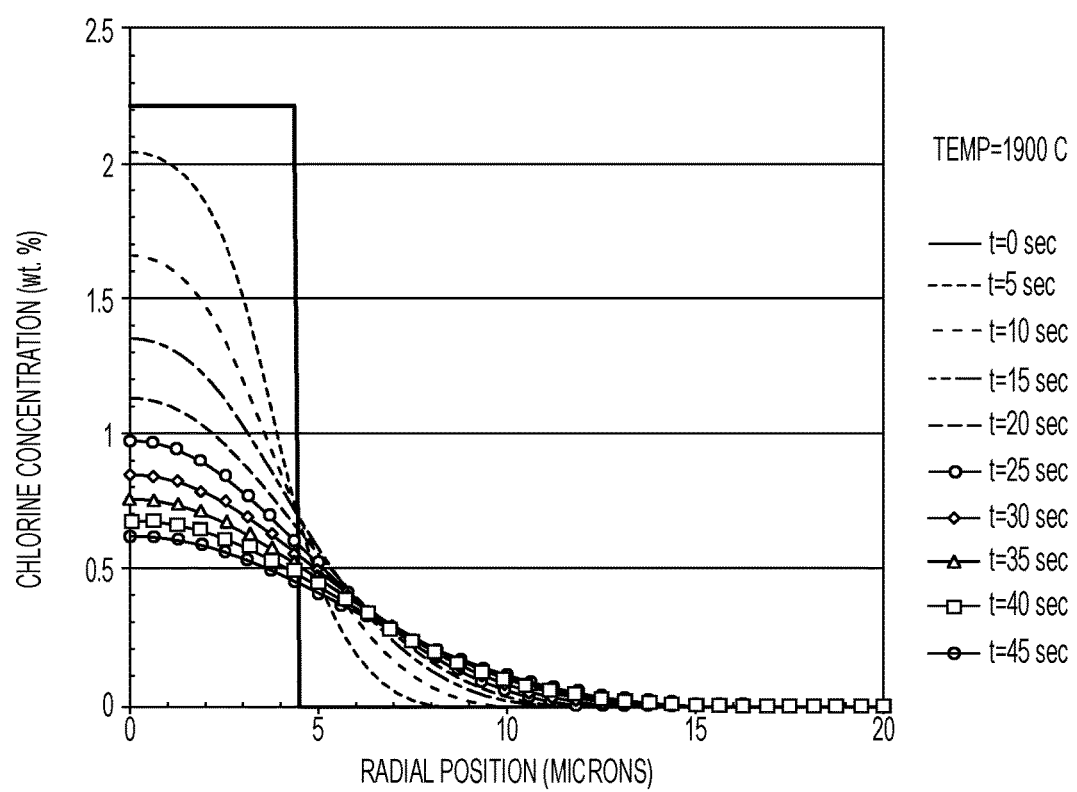
FIG. 9A illustrates evolution of chlorine profile (Cl concentration (wt %)) with exposure time at 1900° C. in a fiber having core doped with chlorine and cladding doped with fluorine.
Figure 9B:
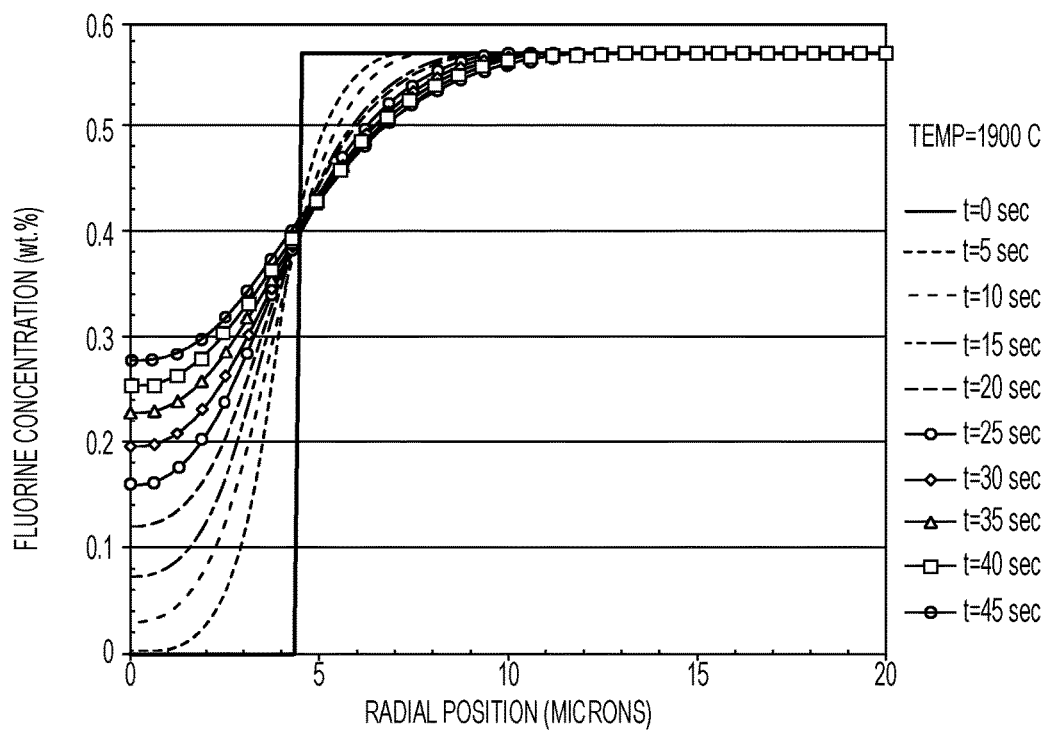
FIG. 9B illustrates evolution of fluorine profile (F concentration (wt %)) with exposure time at 1900° C. in a fiber having core doped with chlorine and cladding doped with fluorine.
Figure 9C:
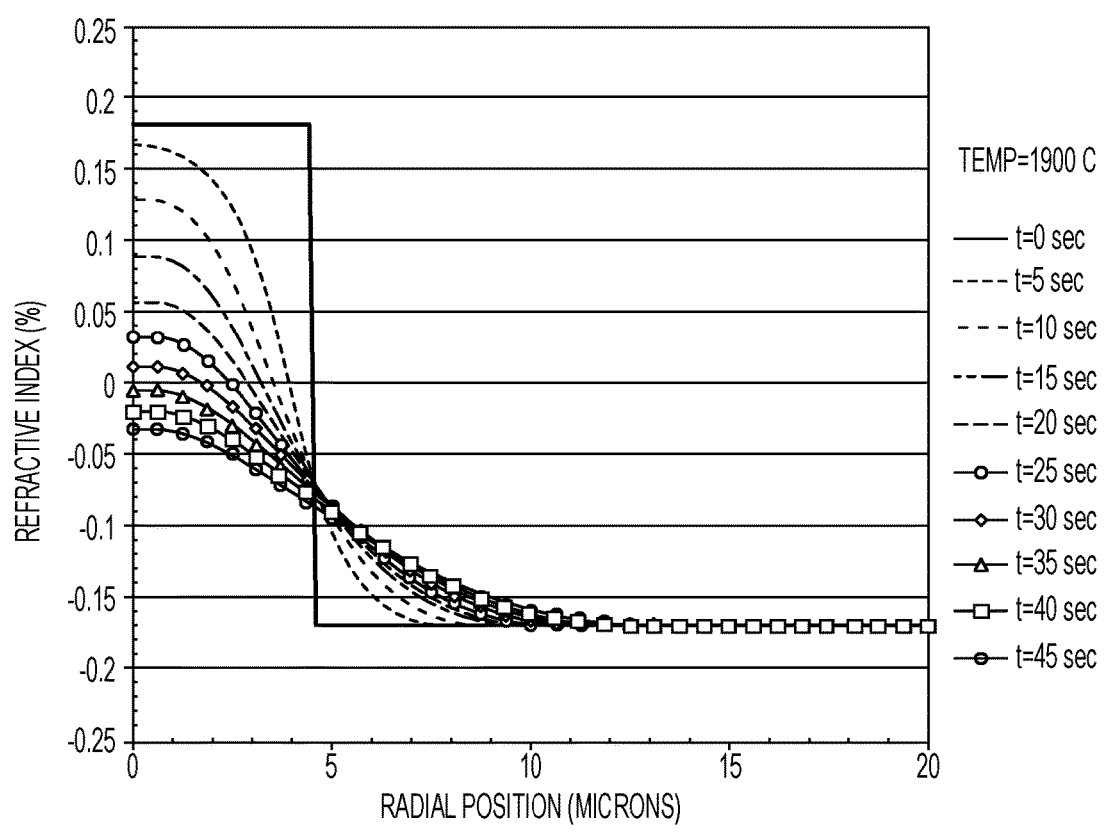
FIG. 9C illustrates evolution of refractive index profile with exposure time at 1900° C. in a fiber having core doped with chlorine and cladding doped with fluorine.

Similarly, FIGS. 9A-9B illustrate how Cl and F diffuse in silica at a temperature Td=1900° C.) in a fiber having chlorine doped silica based core and fluorine doped silica based cladding, and FIG. 9C illustrates the resultant relative refractive index delta profile of the fiber at location $D_{max}$, after the fiber is treated at the temperature of 1900° C. for less than 1 min of total time. For example, the step of applying of heat may be performed for a total or cumulative time t where 1 sec<t<1 min, and in some embodiments for 3 sec to 45 sec.

Figure 10A:
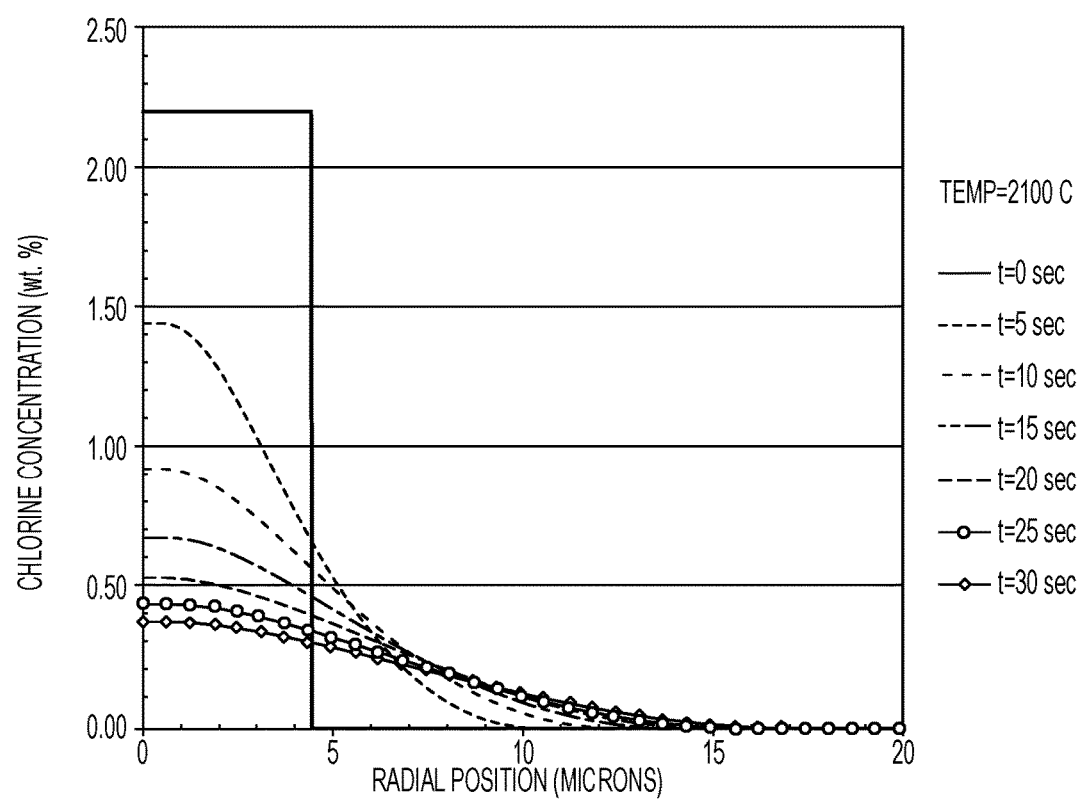
FIG. 10A illustrates evolution of chlorine profile (Cl concentration (wt %)) with exposure time at 2100° C. in a fiber having core doped with chlorine and cladding doped with fluorine.
Figure 10B:
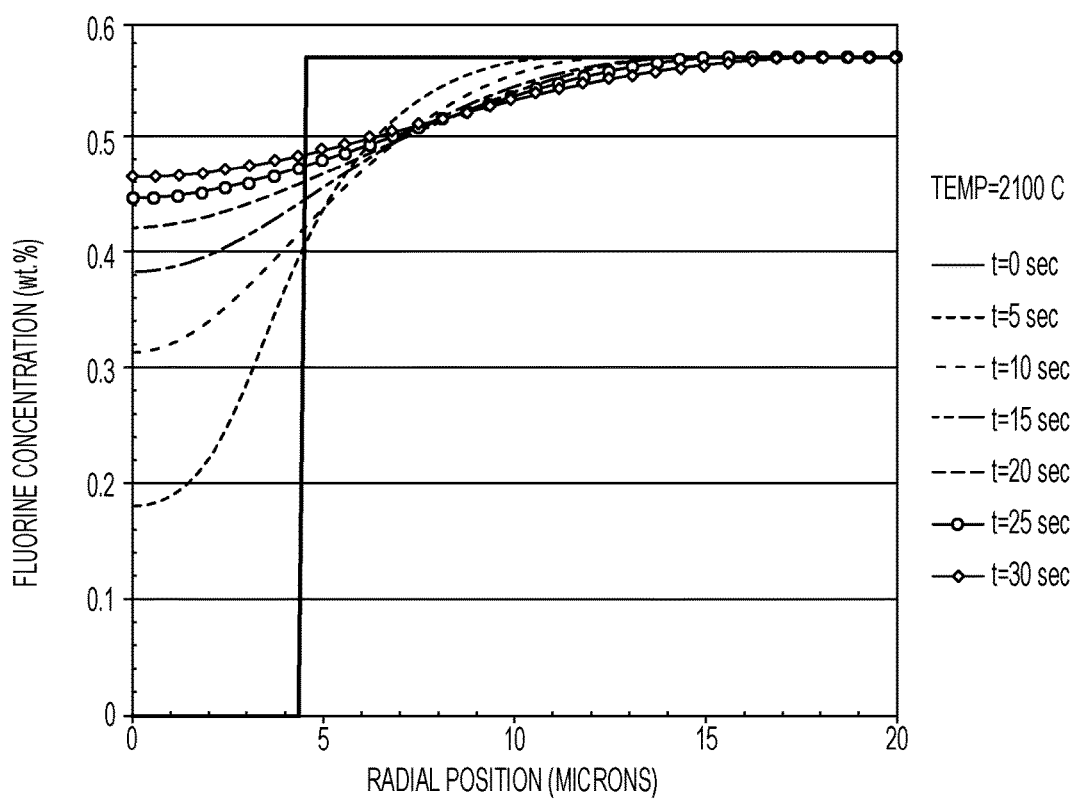
FIG. 10B illustrates evolution of fluorine profile (F concentration (wt %)) with exposure time at 2100° C. in a fiber having core doped with chlorine and cladding doped with fluorine.
Figure 10C:
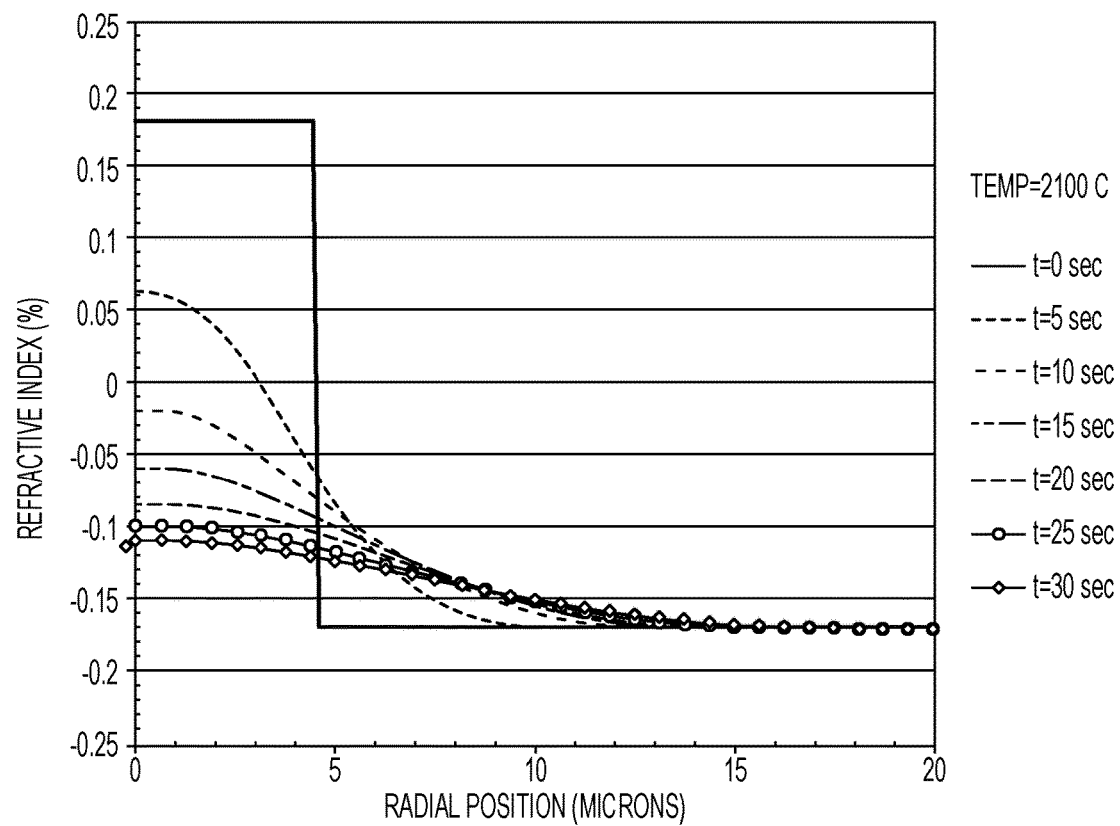
FIG. 10C illustrates evolution of refractive index profile with exposure time at 2100° C. in a fiber having core doped with chlorine and cladding doped with fluorine.

Similarly, FIGS. 10A-10B illustrate how Cl and F diffuse in silica at a temperature Td=2100° C.) in a fiber having chlorine doped core and fluorine doped cladding, and FIG. 10C illustrates the resultant relative refractive index delta profile of the fiber at location $D_{max}$, as a function of total time t at this temperature. For temperatures Td that above the softening point of the cladding layer of the fiber, the total (cumulative) exposure times are less than 1 minute, and in some embodiments 45 seconds or less, less than 30 seconds in still other embodiments, and less than 15 seconds in yet other embodiments 5-15 seconds. We discovered that when the fiber has Cl doped core with Cl concentration of at least 0.5 wt %, we can create adiabatic tapers in less than 1 minute (e.g., 1 sec to 45 sec), at temperatures between about 1500° and about 2100° C., without creating undesirable deformation(s).

As can be seen from results presented in FIGS. 8, 9C, and 10C, the refractive index difference between the core and the cladding decreases and the radius of the core increases because of the diffusion of both chlorine and fluorine dopants (Cl defuses out, or away from the core center, and F diffuses out of the cladding, towards the center of the core, smoothing the transition between the core/cladding boundary. FIGS. 8C, 9C, and 10C illustrate that the refractive index profile in the cross sectional areas of the fiber that undergone thermally induced dopant diffusion changed, and is no longer a step index profile, It is noted that if the original fiber was not a step index fiber, but a graded index fiber (e.g., a fiber having a core with an alpha value of 1.8 to 3), such fiber when subjected to a temperature Td would also exhibit Cl diffusivity towards the edge that would decrease the refractive index of the core relative to the cladding, and increase the core size. These changes in refractive index profile results in expansion of the MFD required for the optical fiber (also referred to as jumper fiber herein), such as, for example, optical fibers 10.

Figure 11A:
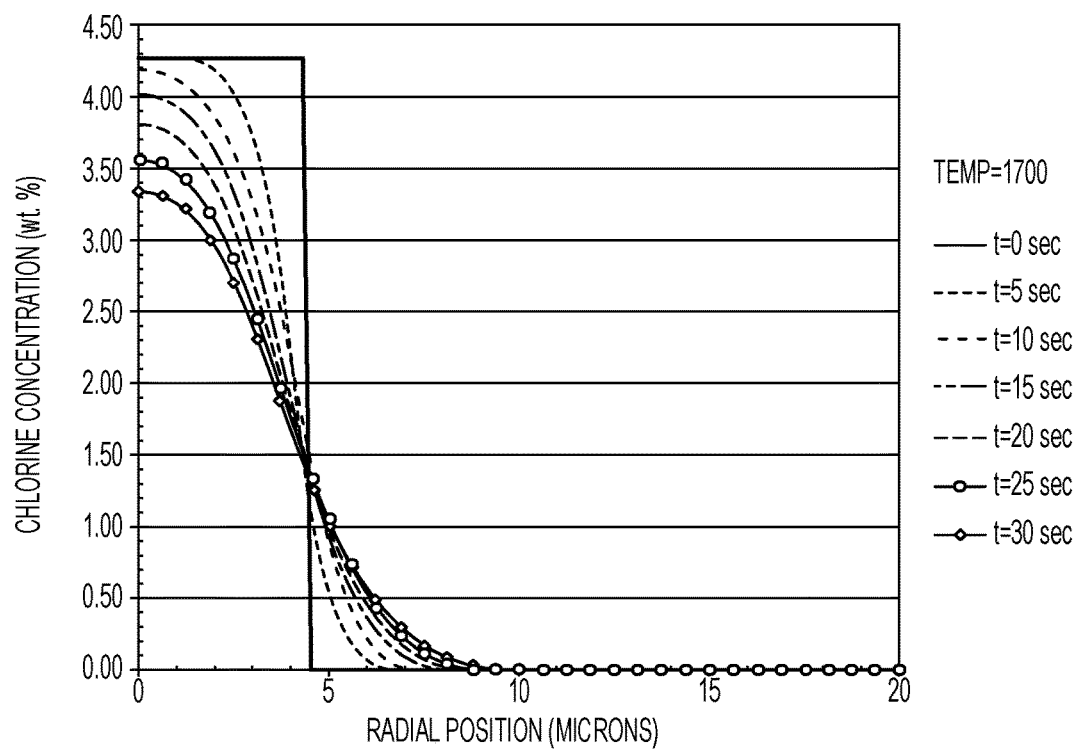
FIG. 11A illustrates evolution of chlorine profile (Cl concentration (wt %)) with exposure time at 1700° C. in a fiber having core doped with chlorine core and undoped cladding
Figure 11B:
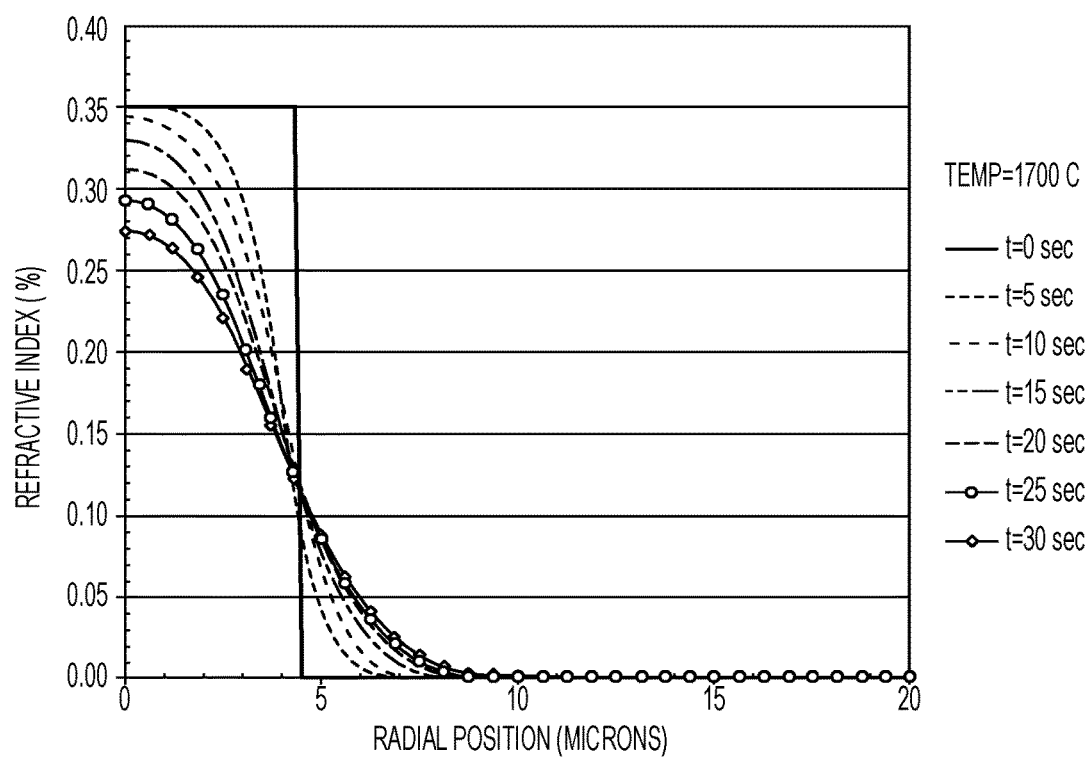
FIG. 11B illustrates evolution of refractive index profile with exposure time at 1700° C. in a fiber having core doped with chlorine core and undoped cladding.

FIGS. 11A-11B correspond to change in the Cl concentrations and refractive index profile at temperatures Td where Td is above the softening point of the fiber cladding layer. FIG. 11A illustrates how Cl diffuses in silica at a temperature Td=1700° C. as a function of time (where 1 sec<t<1 min, e.g., 3 sec<t≤45 sec) in a fiber having chlorine doped core and an undoped (i.e., pure silica) cladding. FIG. 11B illustrates the resultant relative refractive index delta profile of the fiber at location $D_{max}$ after the fiber is heated to 1700° C. for the specified cumulative time t (after fiber is treated at this temperature Td for these periods of time).

Figure 12A:
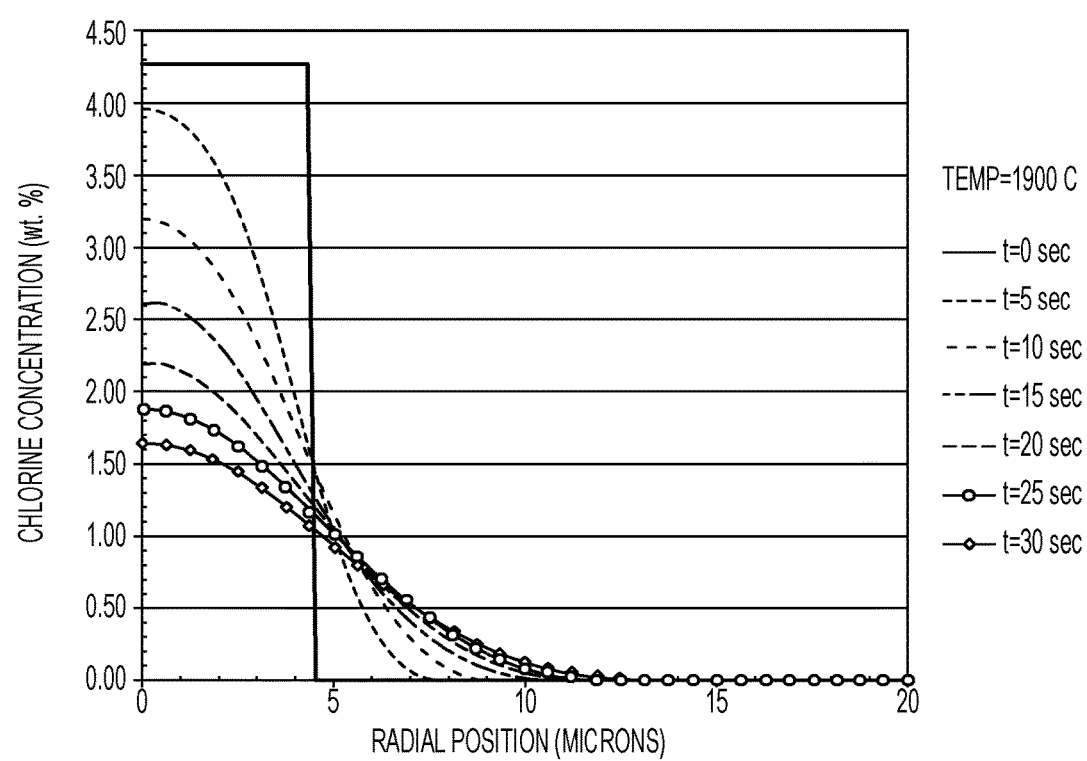
FIG. 12A illustrates evolution of chlorine profile (Cl concentration (wt %)) with exposure time at 1900° C. in a fiber having core doped with chlorine core and undoped cladding.
Figure 12B:
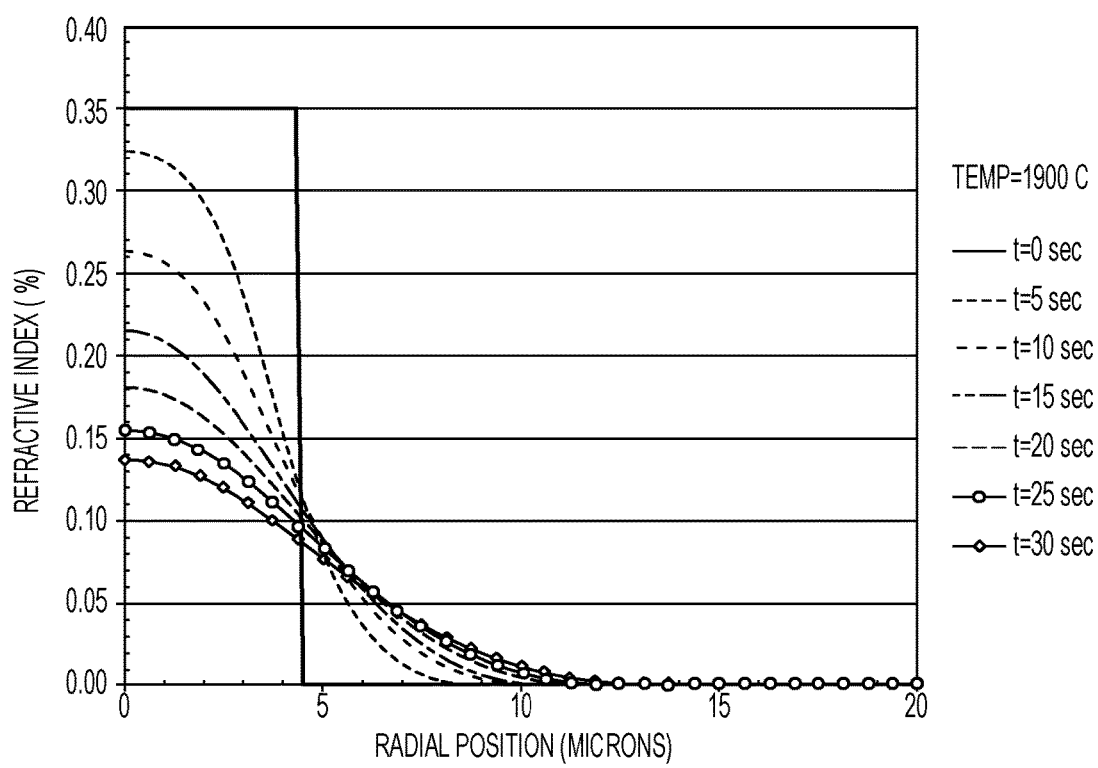
FIG. 12B illustrates evolution of refractive index profile with exposure time at 1900° C. in a fiber having core doped with chlorine core and undoped cladding.
Figure 13A:
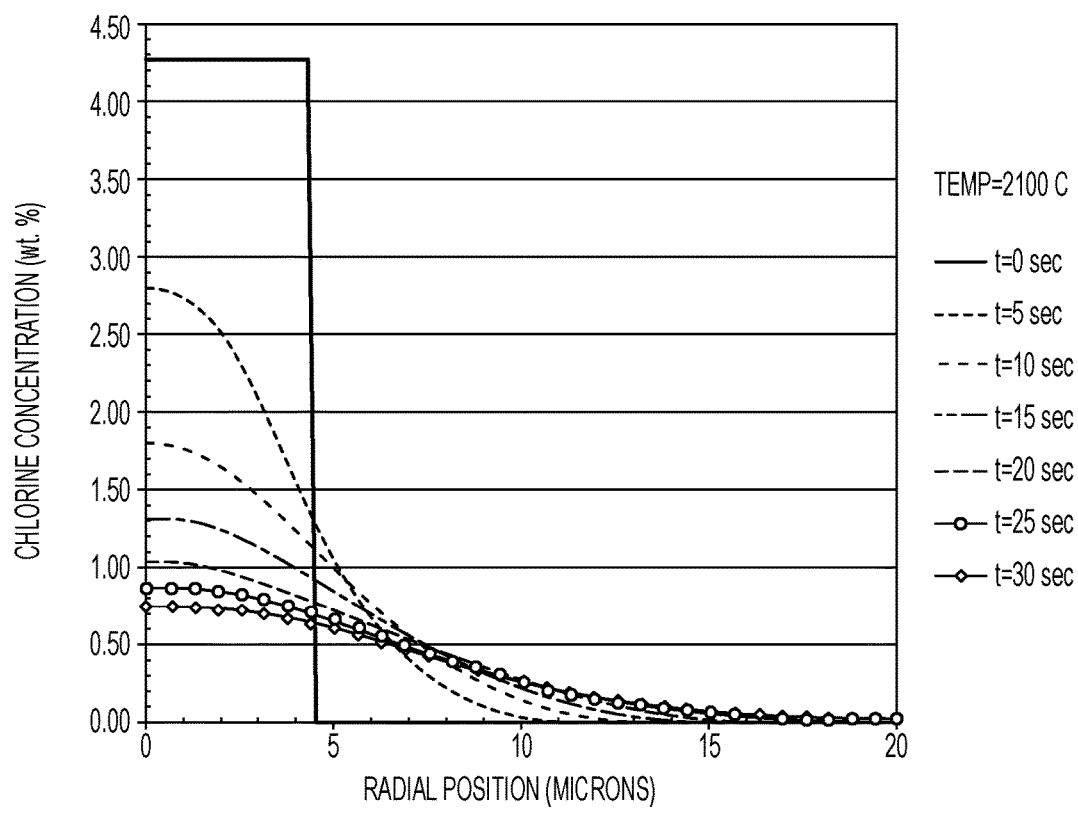
FIG. 13A illustrates evolution of chlorine profile (Cl concentration (wt %)) with exposure time at 2100° C. in a fiber having core doped with chlorine core and undoped cladding.
Figure 13B:
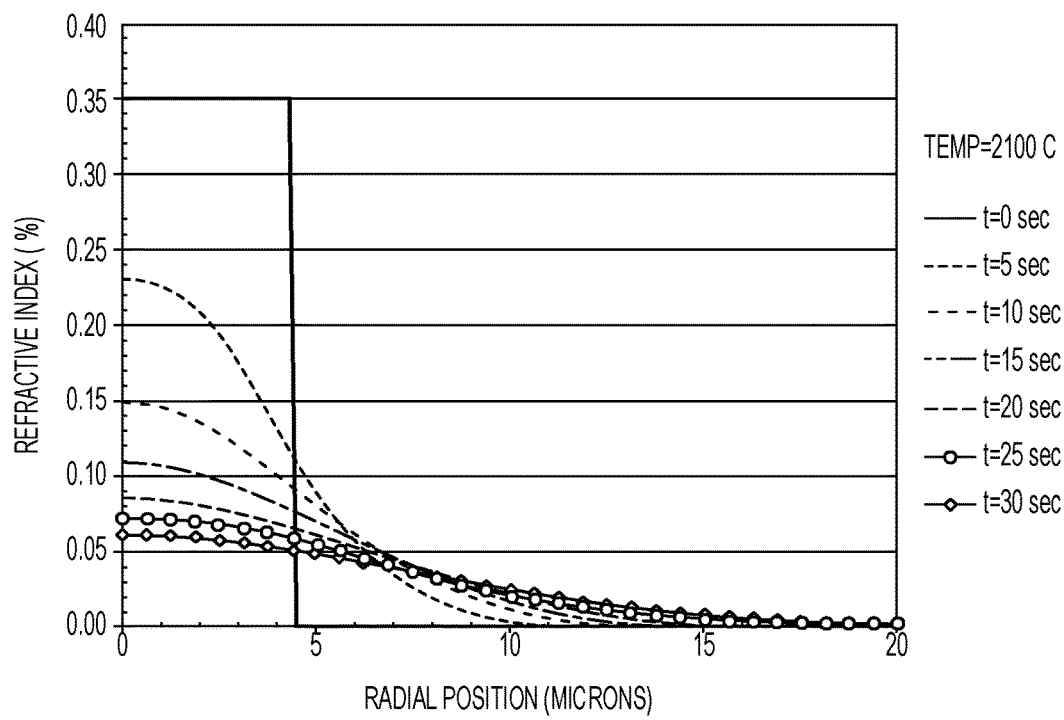
FIG. 13B illustrates evolution of refractive index profile with exposure time at 2100° C. in a fiber having core doped with chlorine core and undoped cladding.

Similarly, FIG. 12A illustrate how Cl diffuse in silica at a temperature Td=1900° C.) in a fiber having chlorine doped core and undoped cladding, and FIG. 12B illustrates the resultant relative refractive index delta profile of the fiber at location $D_{max}$, after the fiber is treated at the temperature of 1900° C. for less than 1 min (i.e., 1 sec<t<1 min). Similarly, FIG. 13A illustrate how Cl diffuses in silica at a temperature Td=2100° C. in a fiber having chlorine doped core and undoped cladding, and FIG. 13B illustrates the resultant relative refractive index delta profile of the fiber at location $D_{max}$, as a function of time t. For temperatures Td that above the softening point of the cladding layer of the fiber, the exposure times are less than 1 minute, and in some embodiments 45 seconds or less, less than 30 seconds in still other embodiments, and less than 15 seconds in yet other embodiments 5-15 seconds.

We discovered that when the fiber has Cl doped core with Cl concentration of at least 0.5 wt %, we can create adiabatic tapers in less than 1 minute (e.g., 1 sec to 45 sec), at temperatures between about 1500° and about 2100° C., without creating undesirable deformation(s).

Figure 14A:
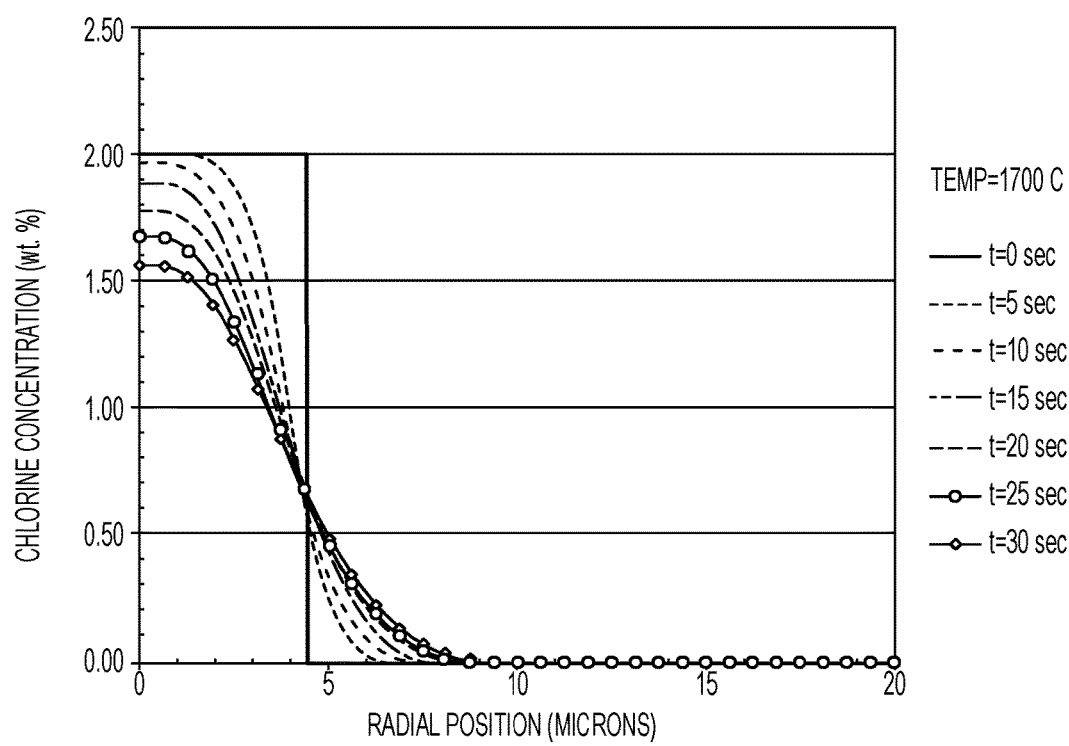
FIG. 14A illustrates evolution of chlorine profile (Cl concentration (wt %)) with exposure time at 1700° C. in a fiber having core doped with chlorine and fluorine and cladding doped with fluorine
Figure 14B:
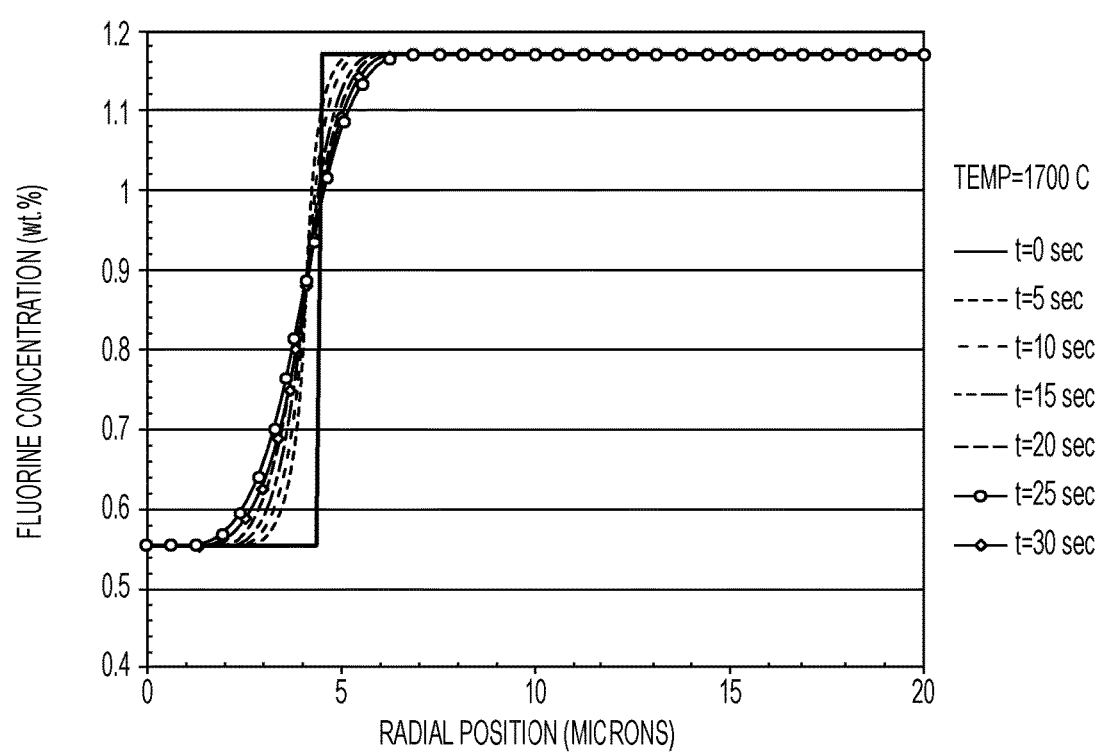
FIG. 14B illustrates evolution of fluorine profile (F concentration (wt %)) with exposure time at 1700° C. in a fiber having core doped with chlorine and fluorine and cladding doped with fluorine.
Figure 14C:
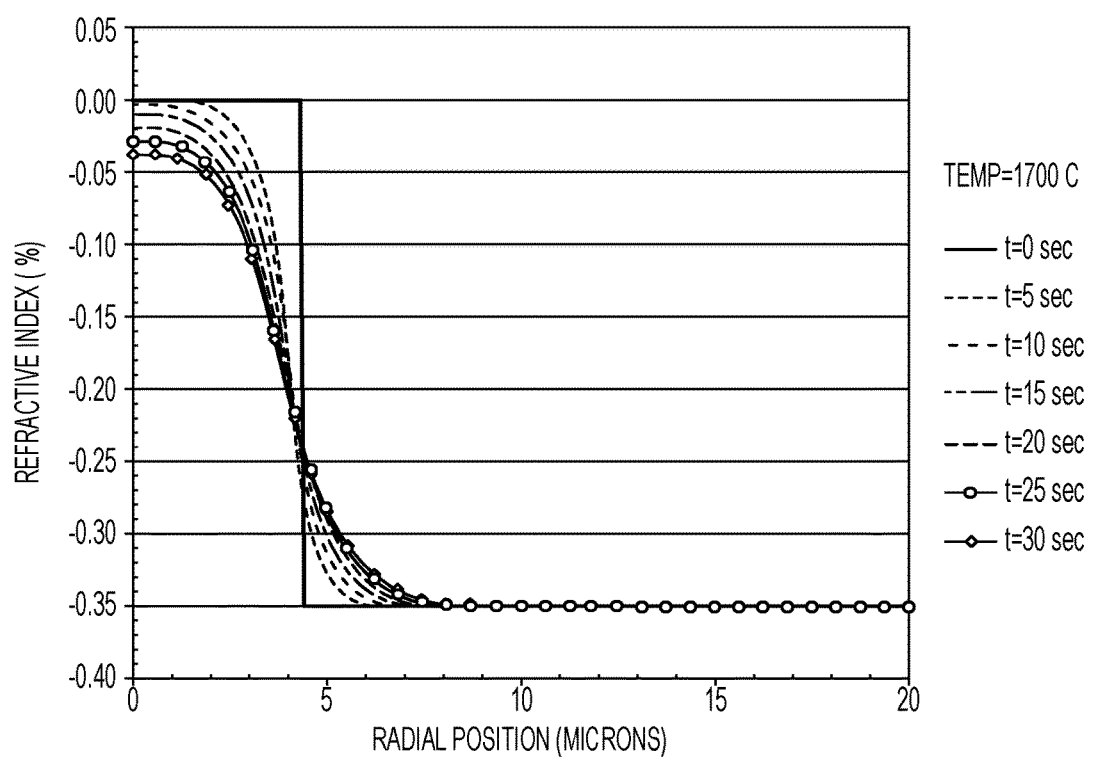
FIG. 14C illustrates evolution of refractive index profile with exposure time at 1700° C. in a fiber having core doped with chlorine and fluorine and cladding doped with fluorine.
Figure 15A:
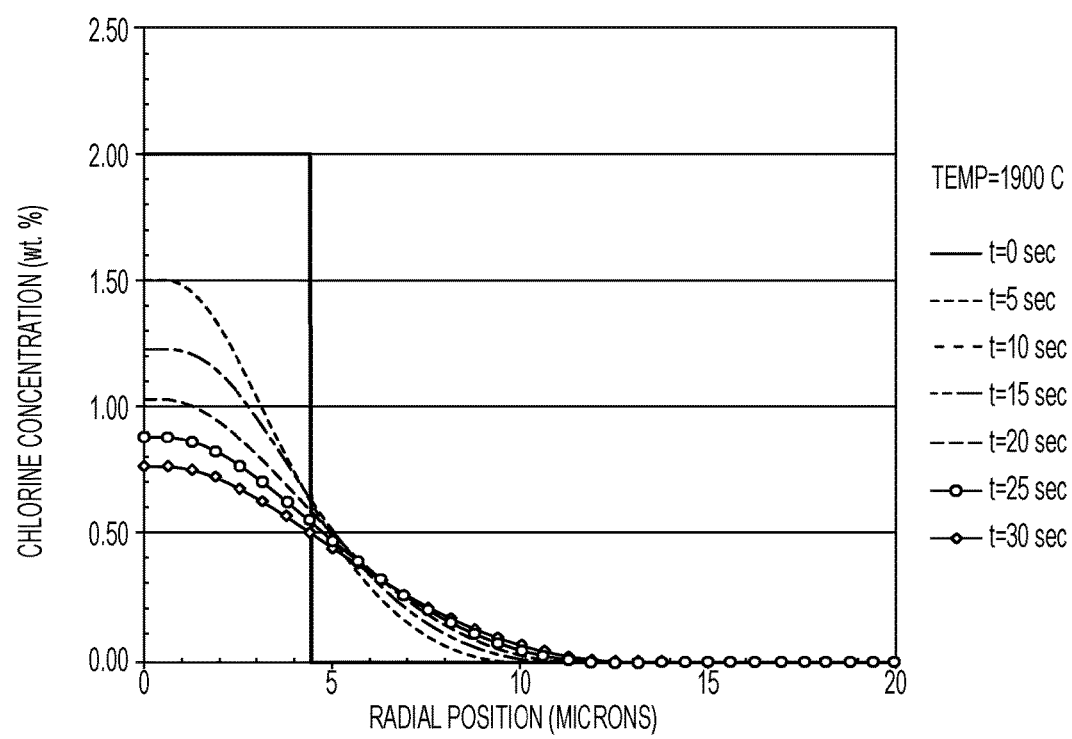
FIG. 15A illustrates evolution of chlorine profile (Cl concentration (wt %)) with exposure time at 1900° C. in a fiber having core doped with chlorine and fluorine and cladding doped with fluorine.
Figure 15B:
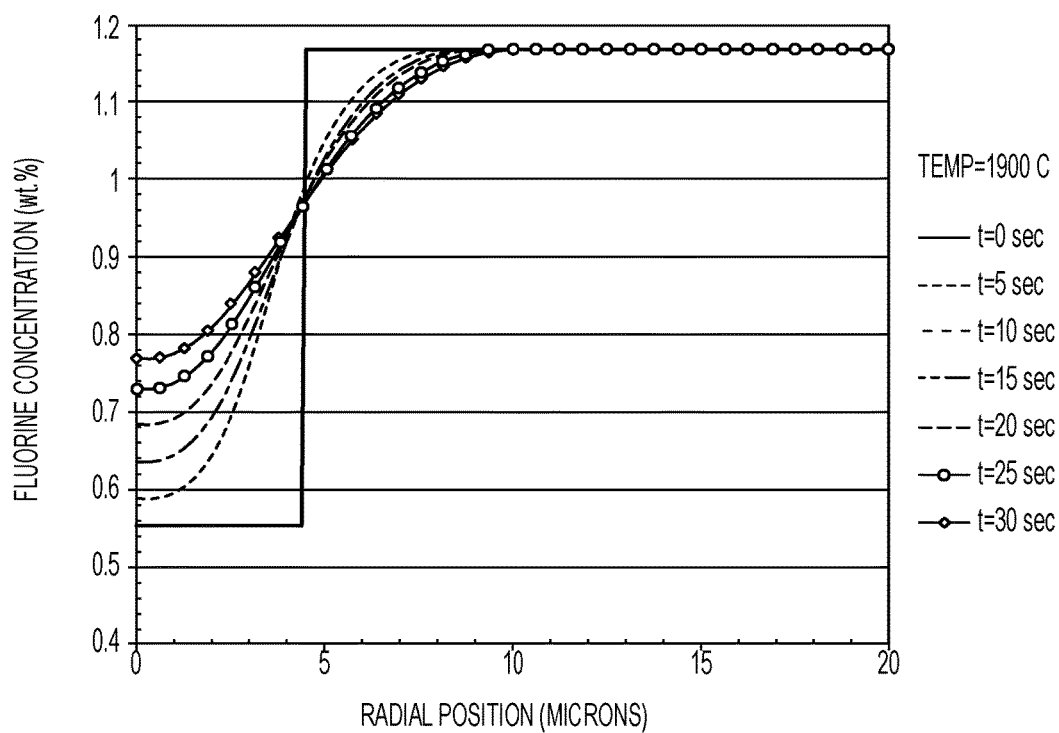
FIG. 15B illustrates evolution of fluorine profile (F concentration (wt %)) with exposure time at 1900° C. in a fiber having core doped with chlorine and fluorine and cladding doped with fluorine.
Figure 15C:
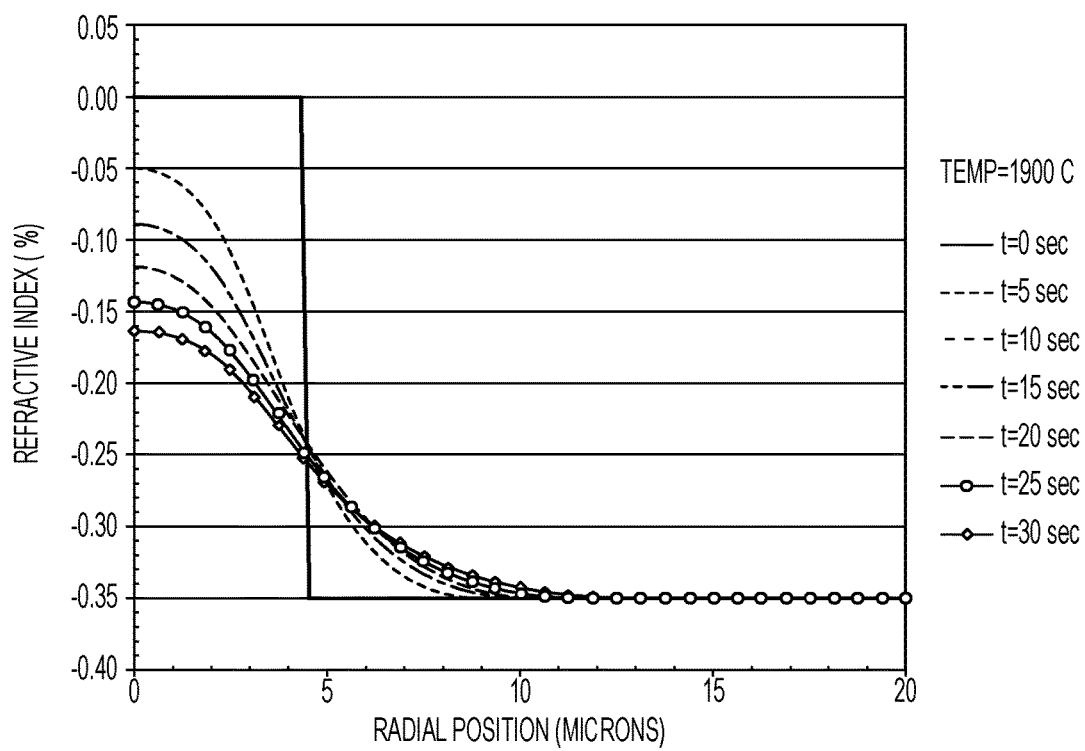
FIG. 15C illustrates evolution of refractive index profile with exposure time at 1900° C. in a fiber having core doped with chlorine and fluorine and cladding doped with fluorine.
Figure 16A:
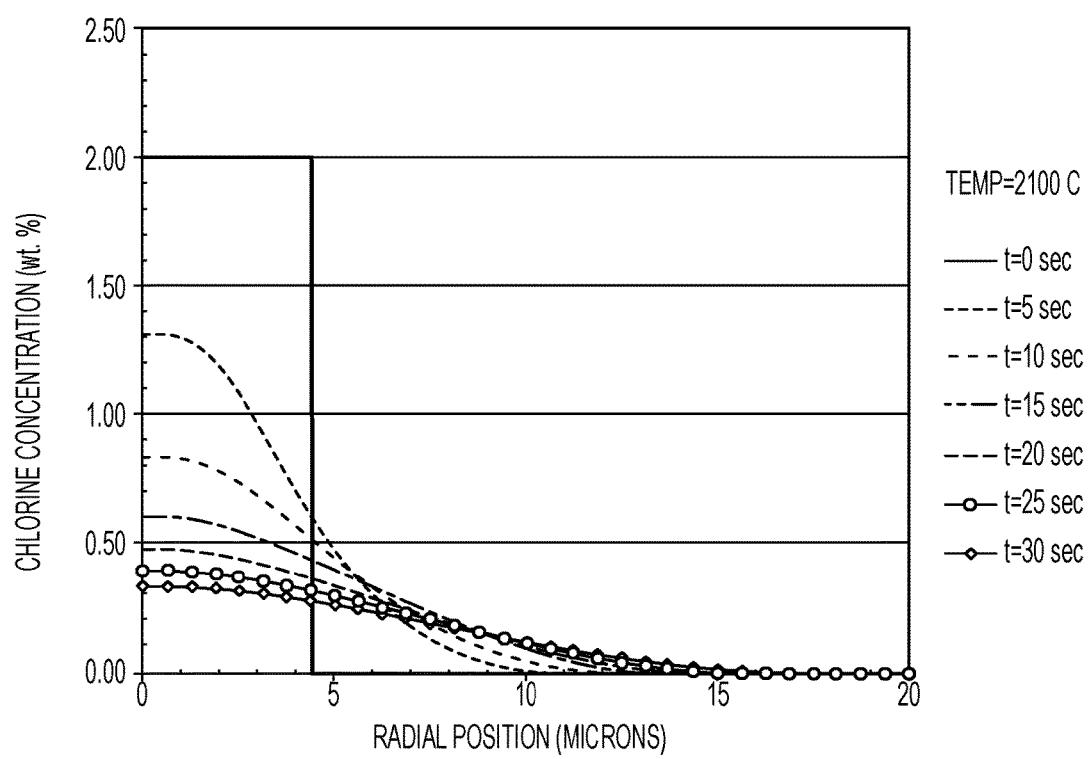
FIG. 16A illustrates evolution of chlorine profile (Cl concentration (wt %)) with exposure time at 2100° C. in a fiber having core doped with chlorine and fluorine and cladding doped with fluorine.
Figure 16B:
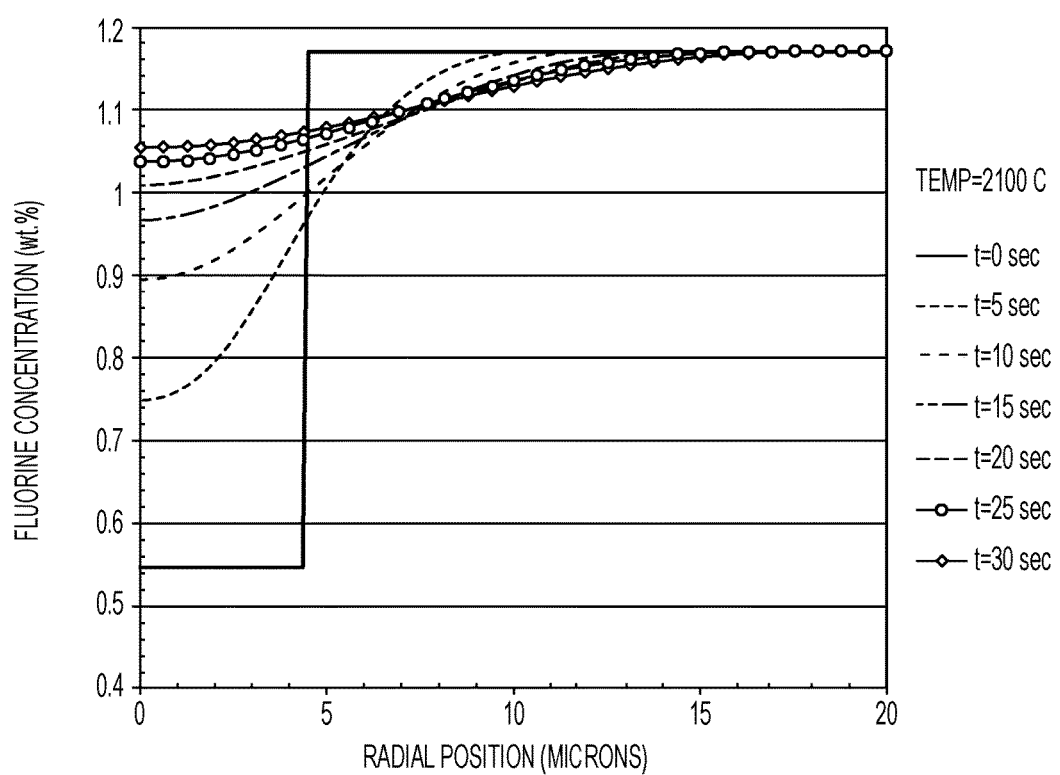
FIG. 16B illustrates evolution of fluorine profile (F concentration (wt %)) with exposure time at 2100° C. in a fiber having core doped with chlorine and fluorine and cladding doped with fluorine.
Figure 16C:
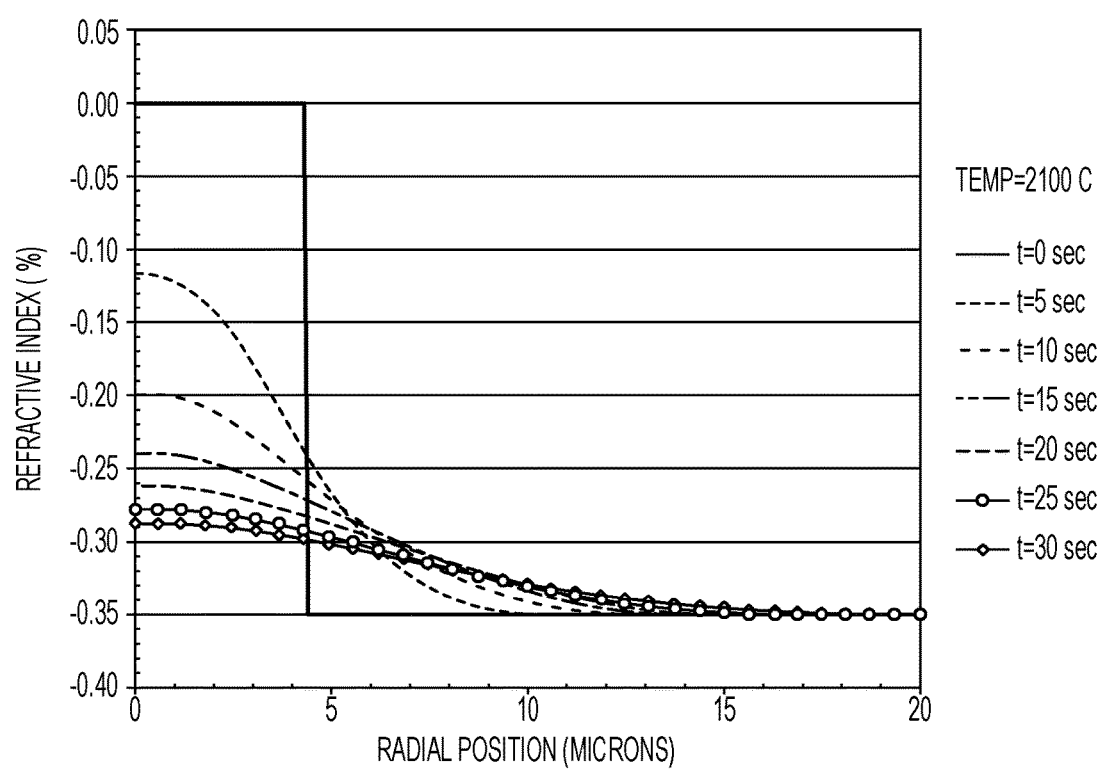
FIG. 16C illustrates evolution of refractive index profile with exposure time at 2100° C. in a fiber having core doped with chlorine and fluorine and cladding doped with fluorine.

FIGS. 14A-14C correspond to change in the Cl/F concentrations and refractive index profile at temperatures Td where Td is above the softening point of the fiber cladding layer. FIGS. 14A-14B illustrate how Cl and F diffuse in silica at a temperature Td=1700° C. as a function of time (where 1 sec<t<1 min, e.g., 3 sec<t≤45 sec) in a fiber having chlorine and fluorine doped silica core and fluorine doped silica based cladding. FIG. 14C illustrates the resultant relative refractive index delta profile of the fiber at location $D_{max}$ after specified periods of time t (after fiber is treated at this temperature Td for these periods of time). Similarly, FIGS. 15A-15B illustrate how Cl and F diffuse in silica at a temperature Td=1900° C.) in a fiber having chlorine and fluorine doped core and fluorine doped cladding, and FIG. 15C illustrates the resultant relative refractive index delta profile of the fiber at location $D_{max}$, after the fiber is treated at the temperature t of 1900° C. for less than 1 min. For example, in the exemplary embodiments described herein, 1 sec<t<1 min, or 1 sec to 45 sec, or 3 sec to 45 sec). Similarly, FIGS. 16A-16B illustrate how Cl and F diffuse in silica at a temperature Td=2100° C.) in a fiber having chlorine and fluorine doped core and fluorine doped cladding, and FIG. 16C illustrates the resultant relative refractive index delta profile of the fiber at location $D_{max}$, as a function of time t. For temperatures Td that above the softening point of the cladding layer of the fiber, the exposure times are less than 1 minute, and in some embodiments 45 seconds or less, less than 30 seconds in still other embodiments, and less than 15 seconds in yet other embodiments, for example 3 to 15 sec or 5-15 seconds. Thus, when the fiber has Cl doped core with Cl concentration of at least 0.5 wt %, we are able to create adiabatic tapers in less than 1 minute (e.g., 1 sec to 45 sec), at temperatures between about 1500° and about 2100° C., without creating undesirable deformation(s).

FIGS. 14A-14C correspond to change in the Cl/F concentrations and refractive index profile at temperatures Td where Td is above the softening point of the fiber cladding layer. FIGS. 14A-14B illustrate how Cl and F diffuse in silica at a temperature Td=1700° C. as a function of time (where 1 sec<t<1 min, e.g., 1 sec<t<50 sec, or 3 sec<t≤45 sec) in a fiber having chlorine and fluorine doped core and fluorine doped cladding. FIG. 14C illustrates the resultant relative refractive index delta profile of the fiber at location $D_{max}$ after specified periods of time t (after fiber is treated at this temperature Td for these periods of time). Similarly, FIGS. 15A-15B illustrate how Cl and F diffuse in silica at a temperature Td=1900° C. in a fiber having chlorine and fluorine doped core and fluorine doped cladding, and FIG. 15C illustrates the resultant relative refractive index delta profile of the fiber at location $D_{max}$, after the fiber is treated at the temperature Td of 1900° C. for less than 1 min (i.e., 1 sec<t<1 min). Similarly, FIGS. 16A-16B illustrate how Cl and F diffuse in silica at a temperature Td=2100° C.) in a fiber having chlorine and fluorine doped core and fluorine doped cladding, and FIG. 16C illustrates the resultant relative refractive index delta profile of the fiber at location $D_{max}$, as a function of time t. For temperatures Td that above the softening point of the cladding layer of the fiber, the exposure times are less than 1 minute, and in some embodiments 45 seconds or less, less than 30 seconds in still other embodiments, and less than 15 seconds in yet other embodiments 5-15 seconds. We discovered that when the fiber has Cl doped core with Cl concentration of at least 0.5 wt %, we can create adiabatic tapers in less than 1 minute (e.g., 1 sec to 45 sec), at temperatures Td between about 1500° and about 2100° C., without creating undesirable deformation(s).

Figure 17A:
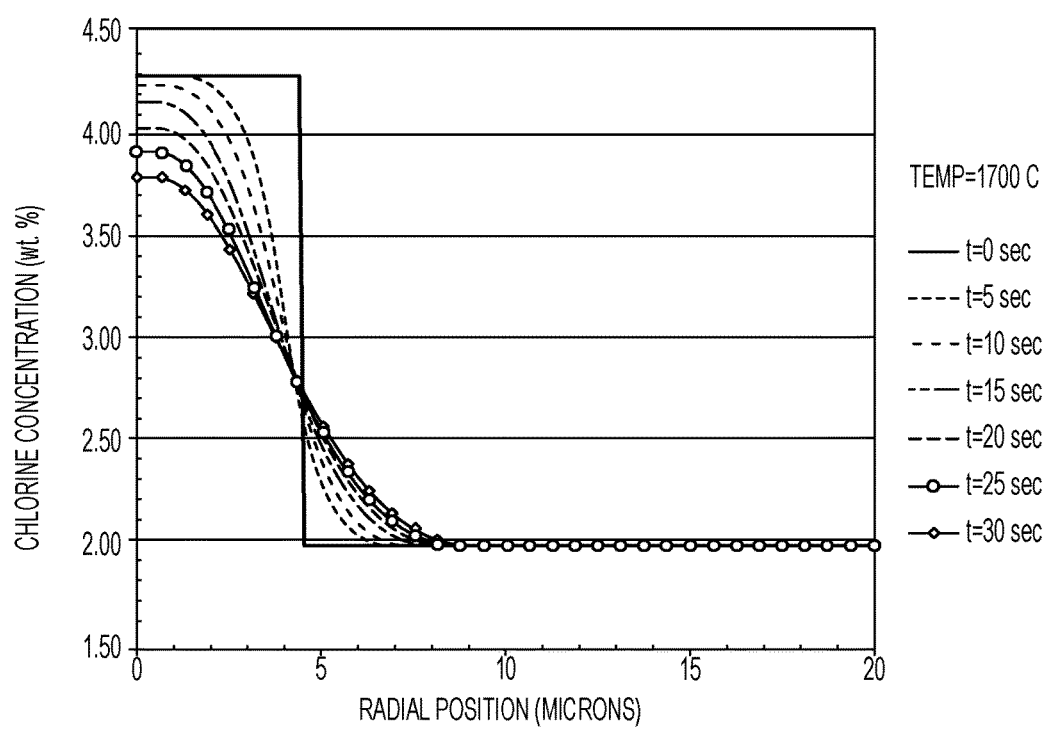
FIG. 17A illustrates evolution of chlorine profile (Cl concentration (wt %)) with exposure time at 1700° C. in a fiber having core doped with chlorine and cladding doped with chlorine and fluorine.
Figure 17B:
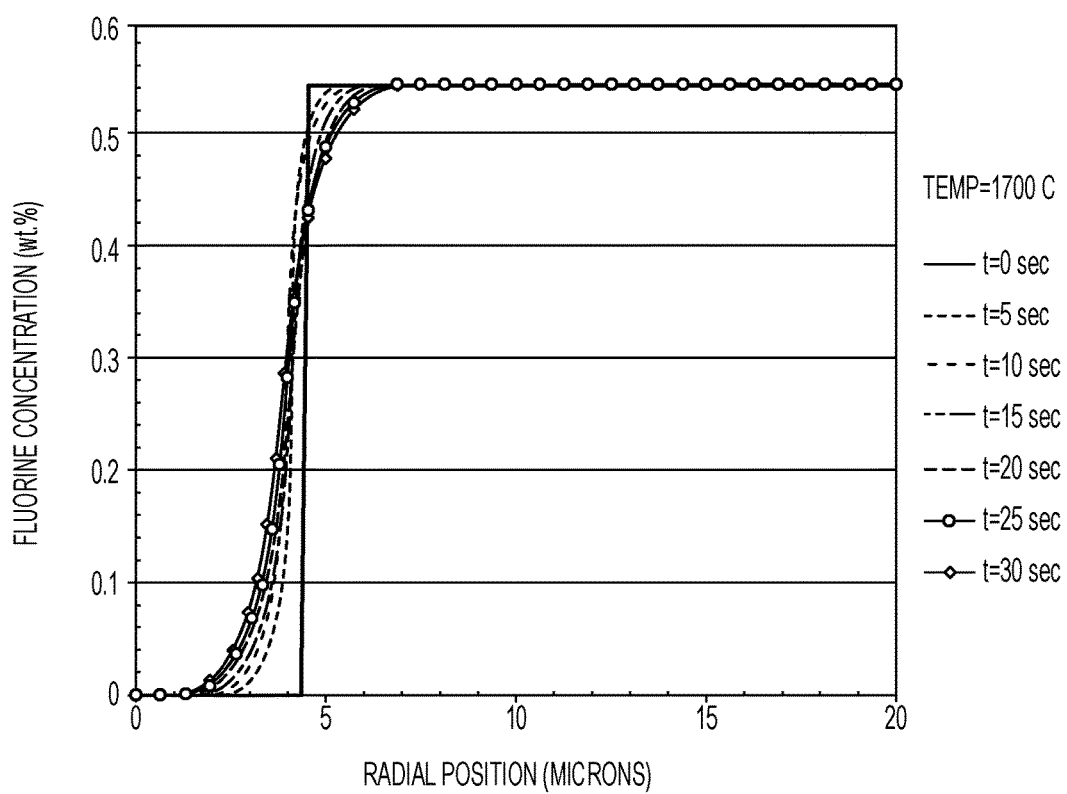
FIG. 17B illustrates evolution of fluorine profile (F concentration (wt %)) with exposure time at 1700° C. in a fiber having core doped with chlorine and cladding doped with chlorine and fluorine.
Figure 17C:
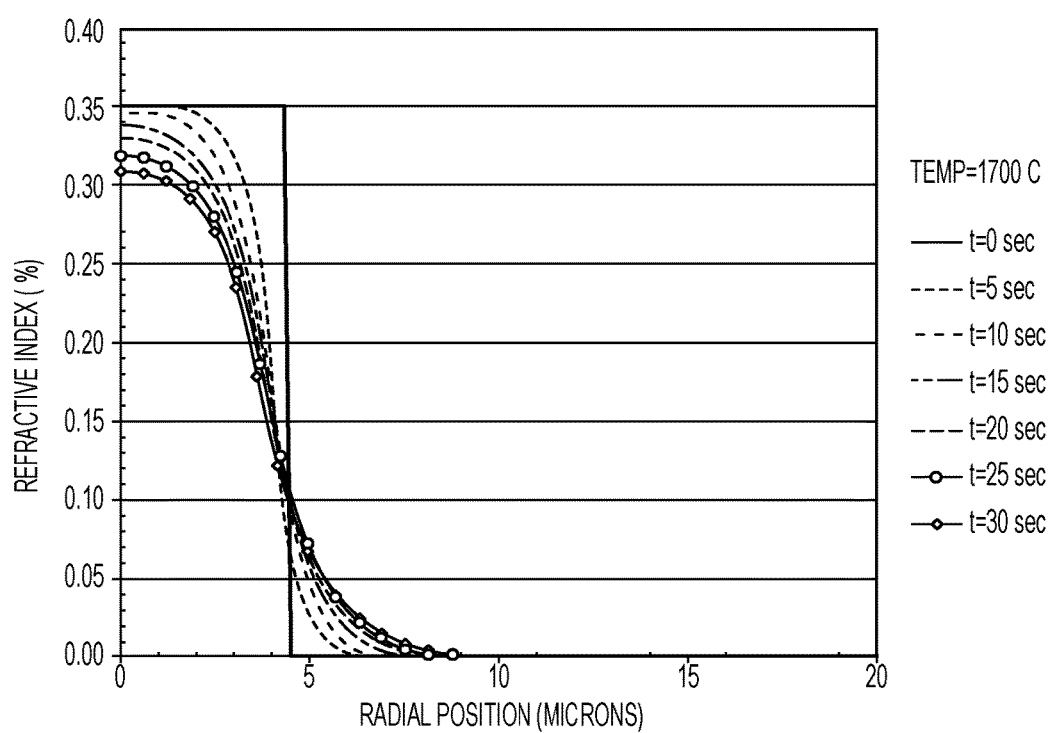
FIG. 17C illustrates evolution of refractive index profile with exposure time at 1700° C. in a fiber having core doped with chlorine and cladding doped with chlorine and fluorine.
Figure 18A:
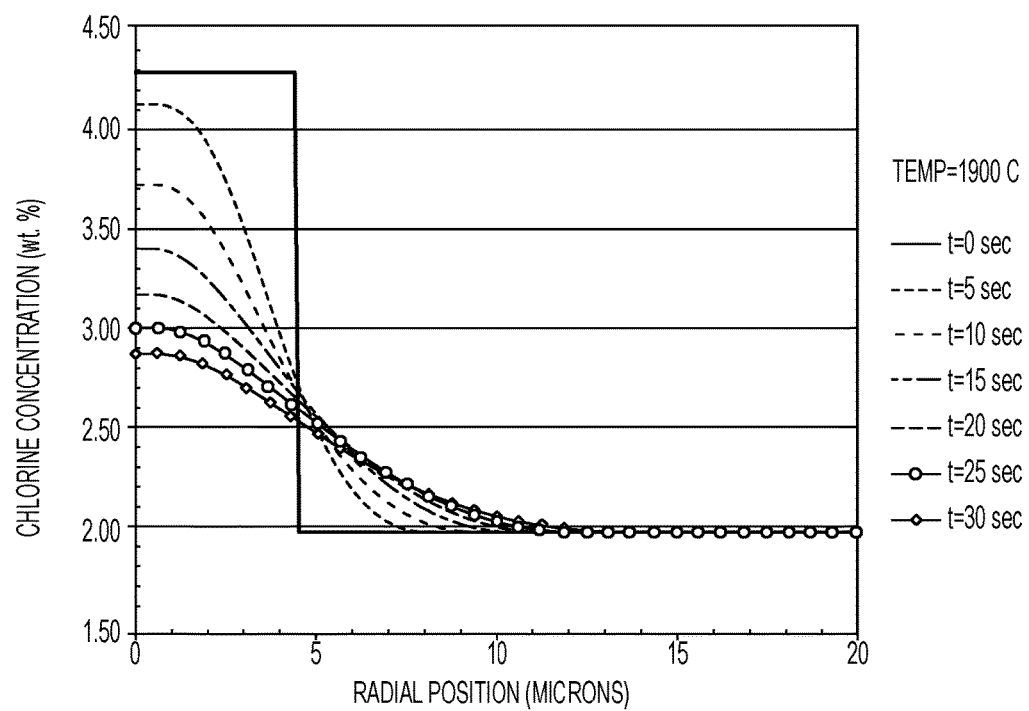
FIG. 18A illustrates evolution of chlorine profile (Cl concentration (wt %) with exposure time at 1900° C. in a fiber having core doped with chlorine and cladding doped with chlorine and fluorine.
Figure 18B:
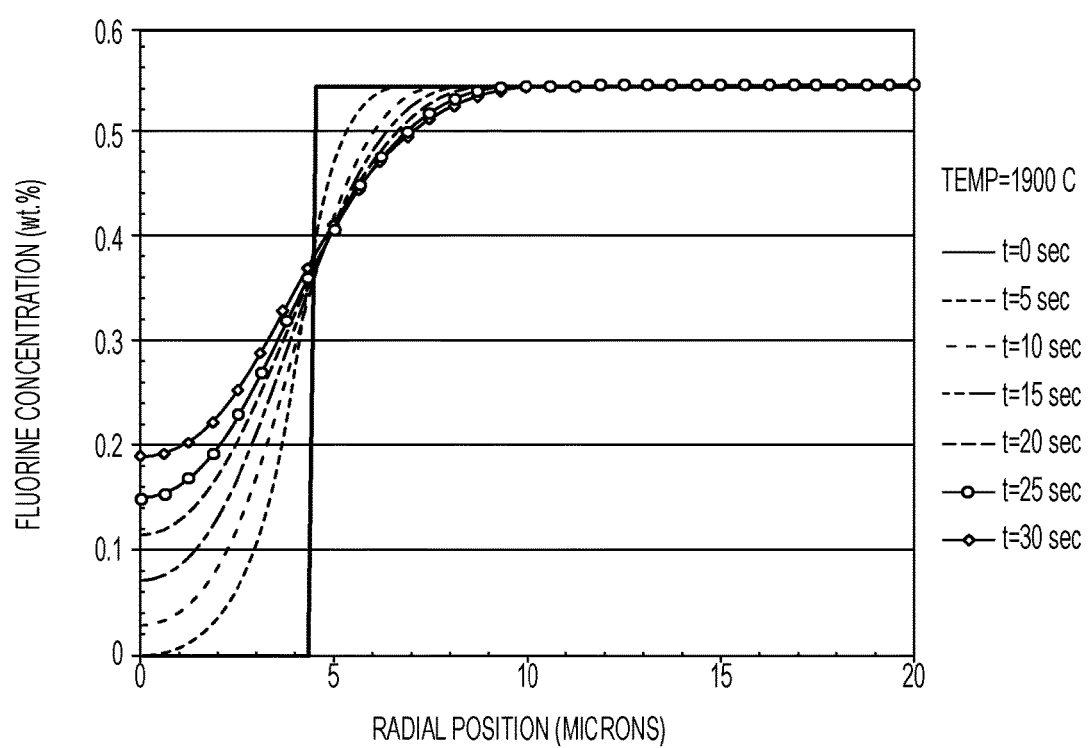
FIG. 18B illustrates evolution of fluorine profile (F concentration (wt %) with exposure time at 1900° C. in a fiber having core doped with chlorine and cladding doped with chlorine and fluorine.
Figure 18C:
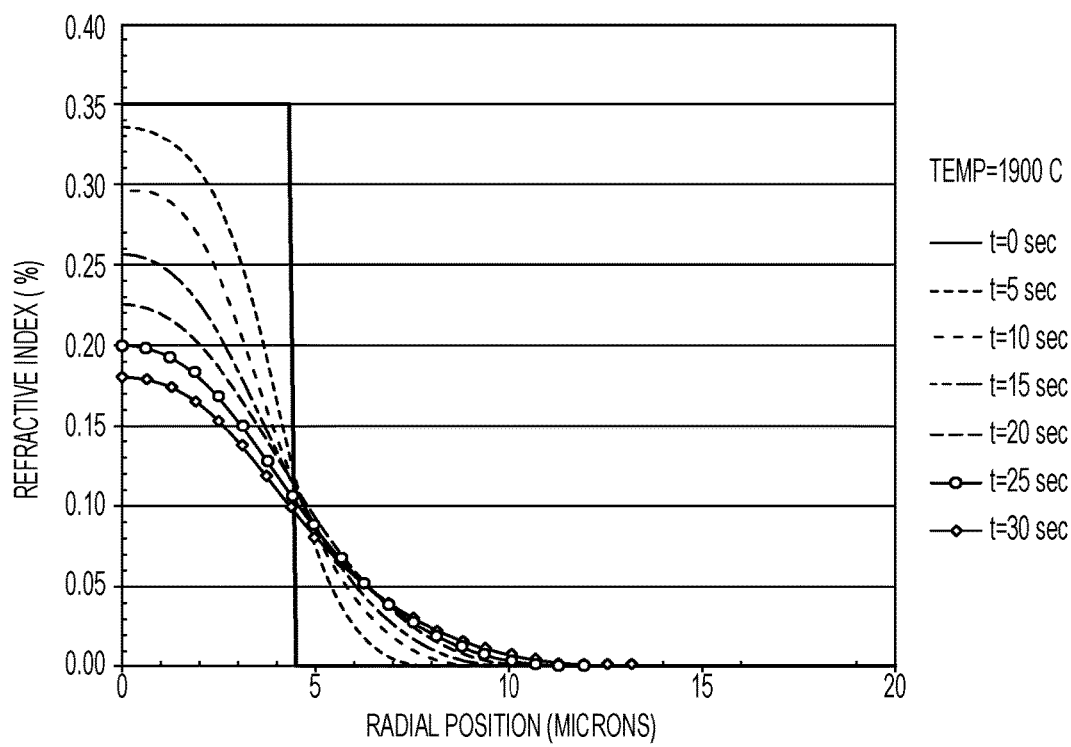
FIG. 18C illustrates evolution of refractive index profile with exposure time at 1900 C in a fiber having core doped with chlorine and cladding doped with chlorine and fluorine.
Figure 19A:
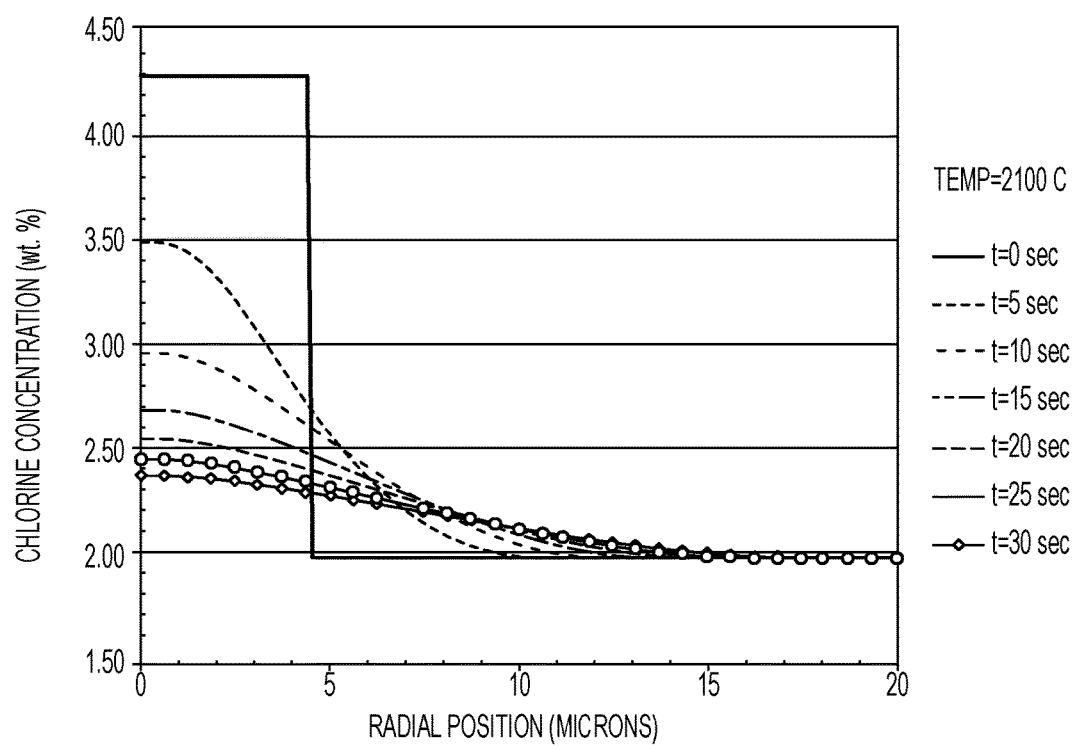
FIG. 19A illustrates evolution of chlorine profile (Cl concentration (wt %)) with exposure time at 1900° C. in a fiber having core doped with chlorine and cladding doped with chlorine and fluorine.
Figure 19B:
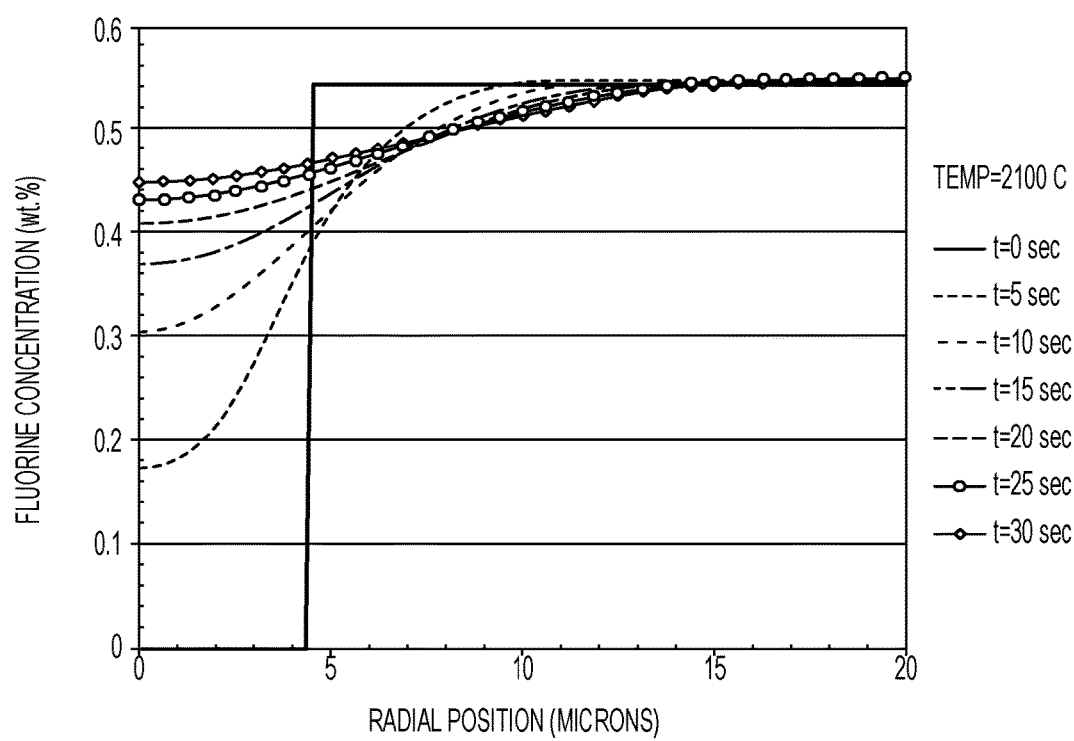
FIG. 19B illustrates evolution of fluorine profile (F concentration (wt %)) with exposure time at 1900° C. in a fiber having core doped with chlorine and cladding doped with chlorine and fluorine.
Figure 19C:
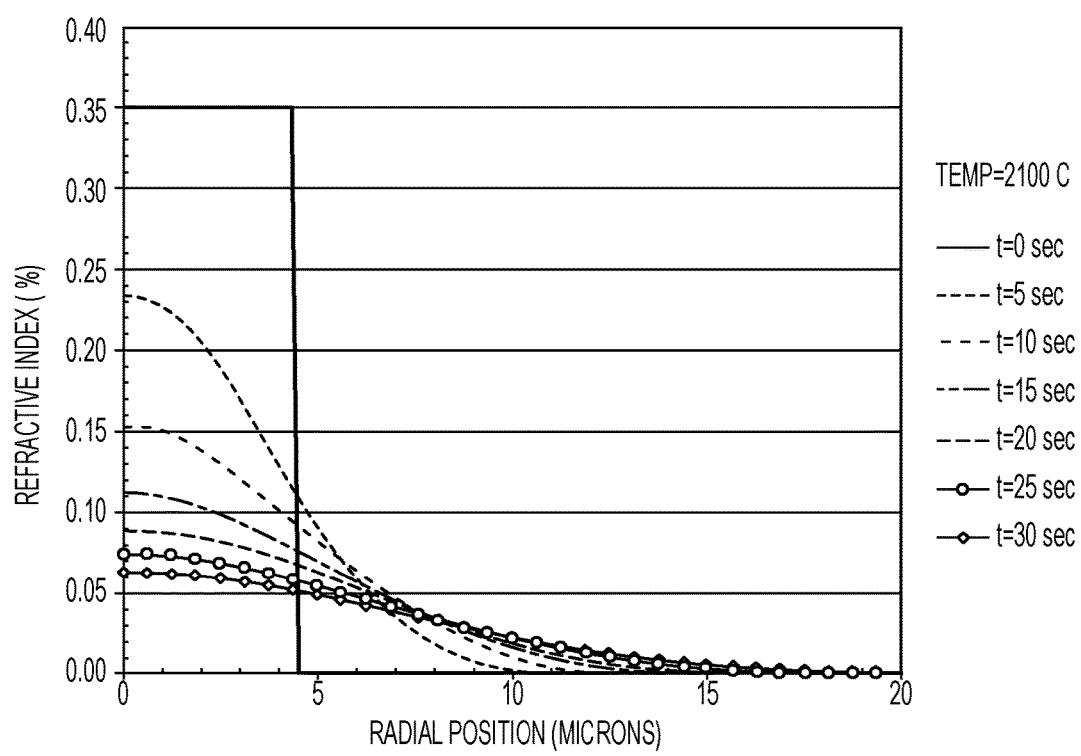
FIG. 19C illustrates evolution of refractive index profile with exposure time at 1900° C. in a fiber having core doped with chlorine and cladding doped with chlorine and fluorine.

FIGS. 17A-17C correspond to change in the Cl/F concentrations and refractive index profile at temperatures Td where Td is above the softening point of the fiber cladding layer. FIGS. 17A-17B illustrate how Cl and F diffuse in silica at a temperature Td=1700° C. as a function of time (where 1 sec<t<1 min, e.g., 3 sec<t≤45 sec) in a fiber having chlorine doped core and chlorine and fluorine doped cladding. FIG. 17C illustrates the resultant relative refractive index delta profile of the fiber at location $D_{max}$ after specified periods of time t (after fiber is treated at this temperature Td for these periods of time). Similarly, FIGS. 18A-18B illustrate how Cl and F diffuse in silica at a temperature Td=1900° C.) in a fiber having chlorine doped core and chlorine and fluorine doped cladding, and FIG. 18C illustrates the resultant relative refractive index delta profile of the fiber at location $D_{max}$, after the fiber is treated at the temperature of 1900° C. for less than 1 min (i.e., 1 sec<t<1 min). Similarly, FIGS. 19A-19B illustrate how Cl and F diffuse in silica at a temperature Td=2100° C.) in a fiber having chlorine doped core and chlorine and fluorine doped cladding, and FIG. 19C illustrates the resultant relative refractive index delta profile of the fiber at location $D_{max}$, as a function of time t. For temperatures Td that above the softening point of the cladding layer of the fiber, the exposure times are less than 1 minute, and in some embodiments 45 seconds or less, less than 30 seconds in still other embodiments, and less than 15 seconds in yet other embodiments 5-15 seconds. We discovered that when the fiber has Cl doped core with Cl concentration of at least 0.5 wt %, we can create adiabatic tapers in less than 1 minute (e.g., 1 sec to 45 sec), at temperatures between about 1500° C., ° and about 2100° C., without creating undesirable deformation(s).

The optical fibers 10 described herein are suitable for efficient coupling of optical signals to photonic devices. According to at least some embodiments disclosed herein, the optical fiber 10 includes a Cl doped tapered core region 24 with a changing outer diameter and changing maximum core refractive index to provide improved coupling at wavelength of interest to photonic devices. The photonic devices may be, for example, silicon photonic devices with an operating wavelength at or near 1310 nm.

In addition to optical fibers, the present disclosure extends to systems (e.g., an integrated systems) 500 that incorporate the optical fibers 10. In one embodiment, the system 500 includes a photonic device 200 (e.g., a silicon photonic device) and the optical fiber 10. The photonic device includes, for example, a microelectronic chip, a light source (e.g. semiconductor laser or LED) 50, and a waveguide, such as for example a silicon photonic (SiP) waveguide 50'. In one embodiment, the light source 50 operates at a wavelength at or near 1310 nm (e.g., in the range from 1250 nm to 1350 nm, or in the range from 1275 nm to 1325 nm, or in the range from 1290 nm to 1320 nm, or in the range from 1200 nm to 1400 nm). The photonic device 200 may be coupled to a transition waveguide 60' (e.g., a transition optical fiber 60" with a tapered core 24') for exchanging optical signals between the photonic device 200 and external elements of the system. The photonic device 200 may be an active device that receives an electrical signal, converts the electrical signal to an optical signal, directs the optical signal to the waveguide and delivers the optical signal through the waveguide to the interface or interfacing waveguide for delivery to external devices. Alternatively, the photonic device 200 may be a passive device that receives and transfers an optical signal to an interface for delivery to external devices. The system 500 includes an optical fiber 10 of the type disclosed herein. Optical fiber 10 may be coupled directly to the photonic device, or coupled to the photonic device through a transition waveguide 60' that is optically coupled to a waveguide 50'. The system 500 may also include peripheral devices such as modulators, detectors, multiplexers, demultiplexers, etc.

In some embodiments, the photonic device 200 is a silicon photonic device 200'. The silicon photonic device 200' may include a silicon chip and 55 a silicon photonic SiP waveguide 50' optically coupled to the silicon chip 55. The silicon photonic device may also include a light source 50. The light source 50 may be a silicon-based light source. The silicon photonic SiP waveguide 50' may be optically coupled to a core 24' of a transition waveguide 60' through an interface 62. The interface 62 may permit transfer of optical signals to or from external devices and the silicon chip or a silicon photonic SiP waveguide 50'. The interfacing silicon photonic SiP waveguide 50' may be a thin film waveguide or a planar waveguide. The interfacing silicon photonic SiP waveguide 50' may be, for example, a polymer waveguide. The interfacing silicon photonic SiP waveguide 50' may be coupled to the transition waveguide 60' and the transition waveguide 60 preferably has an effective area and mode field diameter that permits exchange of optical signals with the interfacing silicon photonic SiP waveguide 50' with minimal losses. The optical fiber 10 may be coupled to the transition waveguide 60' and preferably has an effective area and mode field diameter that permits exchange of optical signals with the transition waveguide 60' with minimal losses. The relative refractive index characteristics of the optical fibers 10, 60″ are designed to enable efficient exchange of optical signals with interfacing waveguides, including planar waveguides and polymer waveguides. The large mode field diameters provided by the optical fibers 10 described herein reduce coupling losses between the optical fibers and optical systems or silicon photonics chip assemblies. For example, coupling losses of standard G.652 single mode optical fibers with silicon photonics chip assemblies can be greater than 2 dB. Coupling losses between the optical fibers 10 and silicon photonics chip assemblies, in contrast, can be less than 1.5 dB, or less than 1.0 dB, or less than 0.5 dB.

Referring again to FIG. 2C, according to one embodiment ad system comprises:
a silicon photonic device 200′ optically coupled to an optical fiber 10, the optical fiber comprising: (a) silica based Cl doped silica based tapered core region 24, the core region 24 having an outer diameter Dc that changes along the length $L_2$ of the tapered core region 24 and a maximum outer diameter $D_{max}$ such that 8 microns≤$D_{max}$≤70 microns; the tapered core region 24 further comprising a maximum core refractive index, Δc that decreases along the length of the tapered core region; and (b) a silica based cladding 40 surrounding the fiber core. Preferably the cladding has a constant outer diameter throughout the length of the fiber. According to some embodiments, the silicon photonic device includes a waveguide 50′, for example a silicon photonic SiP 50′, and the optical fiber 10 is being optically coupled to the waveguide 50′. According to some embodiments the system further comprises an interface 62 between the silicon photonic device 50′ and the transition waveguide 60′, the transition waveguide 60′ optically coupling to the interface 62, the interface 62 optically coupling to the silicon photonic device 200′. The silicon photonic device 200′ may be constructed to operate, for example at a wavelength of 1310 or 1550 nm. According to some embodiments, the system comprises a transition waveguide 60′ situated between the silicon photonic SiP waveguide 50′ of the silicon photonic device 200′, and the optical fiber 10, the optical fiber 10 optically coupling to the transition waveguide 60′, the transition waveguide 60′ optically coupling to the interface 62, the interface 62 optically coupling to the silicon photonic device 200′. According to some embodiments the system, the silicon photonic device includes a waveguide 50′, and the interface 62′ is optically coupled to the silicon photonic device 200′ through a silicon photonic SiP waveguide 50′.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising: a length L, a first end face and a second end face, and a MFD at the first end face of the fiber that is different from MFD at another region of the fiber, the fiber further comprising:
   (I) a Cl doped silica based core comprising:
      (a) a first Cl doped core region having a maximum refractive index $\Delta_0$ such that 0.05%≤$\Delta_0$≤0.6% (relative to undoped silica), and an outer core diameter $D_0$, wherein 5 microns≤$D_0$≤12 microns, said first Cl doped core region having maximum Cl concentration [Cl], where 0.5 wt. %≤[Cl]≤5 wt. %; and
      (b) a Cl doped tapered core region situated adjacent to the first Cl doped core region and to the first fiber end face, the Cl doped tapered core region having a length $L_2$ where 0.05 mm≤$L_2$≤10 mm, and a maximum core refractive index Δc that decreases along the length of the tapered core region, the tapered region having an outer diameter that changes along the length $L_2$ and a maximum diameter $D_{max}$, such that
         (i) $D_{max}$≥$D_0$+3 microns;
         (ii) 8 microns≤$D_{max}$≤70 microns; and
   (II) a silica based cladding surrounding the Cl doped silica based core.

2. A fiber coupler comprising: (i) a housing; (ii) a ferrule situated inside said housing, and an optical fiber of claim 1 situated within said ferrule, said ferrule being structured to receive and support at least a portion of another optical fiber therein.

3. The fiber coupler of claim 2, further comprising said another fiber such that said optical fiber with Cl doped silica based core and said another optical fiber are situated adjacent to one another within the ferrule, and are optically coupled to one another.

4. The optical fiber having of claim 1, wherein:
   (a) the first Cl doped core region has a length $L_1$, and the maximum refractive index $\Delta_0$ of the first Cl doped core region is constant along the length $L_1$, and the outer core diameter $D_0$ of the first Cl doped core region is constant along the length $L_1$, wherein $L_1$>12 cm, and
   (b) said cladding has a constant outer diameter throughout the length L of the optical fiber.

5. The fiber of claim 4, wherein said optical fiber has MFD at the first end face of the fiber that is different from the MFD at the second end face of the optical fiber.

6. The fiber of claim 4, wherein the cladding includes fluorine, and the fiber length L is <100 m.

7. The fiber of claim 4, wherein said core contains at least one region with Cl concentration between 1.1 wt. % and 5 wt. %.

8. The fiber of claim 4, wherein said core contains at least one region with Cl concentration between 1.4 wt. % and 5 wt. %.

9. The fiber of claim 4, wherein said tapered core region has a substantially adiabatic taper and satisfies the following condition:

$$\frac{dD}{dz} \leq 2\frac{D}{\lambda}(n_{eff} - n_{cl})$$

where D is the core diameter at a position z within the tapered core region, λ is the operating wavelength, $n_{eff}$ is the effective index of the fundamental mode, and $n_{cl}$ is the refractive index of the cladding.

10. The fiber of claim 1 wherein said tapered core region has a taper profile, said taper profile being one of: linear, parabolic, exponential, or gaussian taper.

11. The fiber of claim 4, wherein $L_2$ is 0.05 mm≤$L_2$≤1 mm.

12. The fiber of claim 4, wherein $L_2$ is 0.2 mm≤$L_2$≤5 mm.

13. The fiber of claim 4, wherein 10 microns/mm≤$(D_{max}-D_0)/L_2$≤100 microns/mm.

14. The fiber of claim 4, wherein 14 microns/mm≤$(D_{max}-D_0)/L_2$≤86 microns/mm.

15. The fiber of claim 4, wherein 14 microns/mm≤$(D_{max}-D_0)/L_2$≤35 microns/mm.

16. The fiber of claim 4, wherein said tapered core region has a taper profile, said taper profile being one of: linear, parabolic, exponential, or gaussian taper.

17. The fiber of claim 9, wherein λ=1310 nm.

18. The fiber of claim 9, wherein λ=1550 nm.

19. The fiber of claim 9, wherein λ=980 nm.

20. The optical fiber of claim 4 having a maximum core refractive index Δc, wherein 0.0%≤|Δc (at $D_{max}$)|≤0.3%, relative to undoped silica.

21. The optical fiber of claim 4 having a maximum core refractive index Δc, wherein 0.0%≤|Δ$c_x$ (at $D_{max}$)|≤0.2%, relative to undoped silica.

22. The optical fiber of claim 4 having a maximum core refractive index Δc, wherein 0.15%≤[Δ$_0$-Δc (at $D_{max}$)]≤0.37%.

23. The optical fiber of claim 4, wherein the tapered core region has a taper induced loss of ≤0.2 dB at 1550 nm.

24. The optical fiber of claim 4, wherein the tapered core region has a taper induced loss of ≤0.2 dB at 1310 nm.

25. The optical fiber of claim 4, wherein the tapered core region has a taper induced loss of ≤0.1 dB at 1310 nm.

26. A method of forming a low loss taper in a glass optical fiber comprising greater than 0.5 wt % chlorine in a core, the core having an initial mode field diameter MFD (at 1550 nm) and is being surrounded by a cladding, said method comprising the steps of:
expanding the initial core MFD at 1550 nm by at least 3 microns by applying heat to said optical fiber for less than 60 seconds in cumulative duration, thereby diffusing chlorine from the core of the optical fiber into the cladding of the optical fiber;
cleaving said optical fiber at a location where the MFD was expanded by at least 3 microns.

27. The method of claim 26 wherein the step of applying heat is not greater than 45 seconds in cumulative duration.

28. The method of claim 26 wherein the step of applying heat is not greater than 30 seconds in cumulative duration.

29. The method of claim 26, where the maximum amount of chlorine in the fiber core before the step of applying heat is between 0.5 wt. % and 5 wt. %.

30. The method of claim 26, where the maximum amount of chlorine in the fiber core before the step of applying heat is between 1.4 wt. % and 5 wt. %.

31. The method of claim 26 wherein the step of applying heat is performed at a temperature Td, and 1500° C.≤Td≤2100° C.

32. The method of claim 26 wherein the step of applying heat is performed at a temperature Td, and 1700° C.≤Td≤2000° C.

33. A system comprising:
a silicon photonic device optically coupled to an optical fiber, said optical fiber comprising:
a Cl doped silica based tapered core region, the tapered core region having an outer diameter Dc that changes along the length $L_2$ of the tapered core region and a maximum outer diameter $D_{max}$ such that 8 microns≤ $D_{max}$≤70 microns; the tapered core region further comprising a maximum core refractive index Δc that decreases along the length $L_2$ of the tapered core region;
and a silica based cladding surrounding the core region.

34. The system of claim 33, wherein: (i) said silica based cladding has a constant outer diameter throughout the length of the fiber; and/or (ii) said silicon photonic device includes a waveguide, said optical fiber optically being optically coupled to said waveguide.

35. The system of claim 33, further comprising a transition waveguide situated between the silicon photonic device and the optical fiber, said optical fiber being optically coupled to said transition waveguide, said transition waveguide being optically coupled to said silicon photonic device.

36. The system of claim 35, wherein said silicon photonic device comprises:
(i) a silicon photonic SiP waveguide, said transition waveguide being optically coupled to said silicon photonic device through said silicon photonic SiP waveguide, or
(ii) a silicon photonic SiP waveguide, the system further comprising a transition waveguide situated between the silicon photonic device and the optical fiber, wherein the optical fiber is being optically coupled to said silicon photonic SiP waveguide through said transition waveguide.

* * * * *

UNITED STATES PATENT AND TRADEMARK OFFICE
CERTIFICATE OF CORRECTION

PATENT NO.         : 10,429,589 B2
APPLICATION NO.    : 15/888666
DATED              : October 1, 2019
INVENTOR(S)        : Dana Craig Bookbinder et al.

Page 1 of 1

It is certified that error appears in the above-identified patent and that said Letters Patent is hereby corrected as shown below:

In the Claims

In Column 27, Line 25, Claim 26, delete "wt %" and insert -- wt. % --, therefor.

Signed and Sealed this
Twenty-fifth Day of February, 2020

Andrei Iancu
*Director of the United States Patent and Trademark Office*